United States Patent
Tanno et al.

(10) Patent No.: US 6,195,176 B1
(45) Date of Patent: *Feb. 27, 2001

(54) TV CONFERENCE SYSTEM AND TERMINAL EQUIPMENT FOR USE IN THE SAME

(75) Inventors: Koichi Tanno; Masaharu Suzuki; Tsukasa Uehara; Hiroyuki Kawahara, all of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/789,192

(22) Filed: Jan. 24, 1997

Related U.S. Application Data

(62) Division of application No. 08/375,269, filed on Jan. 19, 1995, now Pat. No. 5,636,039, which is a continuation of application No. 07/938,425, filed on Aug. 31, 1992, now abandoned.

(51) Int. Cl.[7] .................................................. H04N 1/00
(52) U.S. Cl. ............................................................. 358/400
(58) Field of Search ..................... 348/15, 1, 17, 348/2, 14; 379/93.17, 93.21, 93.25, 93.09, 93.11, 93.14; 358/400, 405, 468, 505

(56) References Cited

U.S. PATENT DOCUMENTS

| | | | | |
|---|---|---|---|---|
| 3,519,744 | * | 7/1970 | Dorros | 179/2 |
| 3,601,530 | * | 8/1971 | Edson | 178/5.6 |
| 4,980,781 | * | 12/1990 | Yamamoto | 358/474 |
| 5,737,011 | * | 4/1998 | Lukacs | 348/15 |
| 5,745,161 | * | 4/1998 | Ito | 348/15 |
| 5,818,513 | * | 10/1998 | Sano et al. | 348/15 |
| 5,859,663 | * | 1/1999 | Simon | 348/15 |
| 5,953,050 | * | 9/1999 | Kamata et al. | 348/15 |
| 5,969,697 | * | 10/1999 | Tani et al. | 345/1 |

* cited by examiner

Primary Examiner—Jerome Grant
(74) Attorney, Agent, or Firm—Robin, Blecker & Daley

(57) ABSTRACT

A TV conference system, which enables a conference to be conducted between remotely located points, includes a plurality of terminal equipments disposed in the remotely located points for enabling information, such as image information and sound information, to be communicated from one of the remotely located points to another in real time, a controlling circuit for enabling the terminal equipment disposed in one of the remotely located points to be controlled from another, and an operation restricting circuit for restricting execution of a predetermined operation of the terminal equipment which can be operated under remote control. Accordingly, there is provided a TV conference system including an improvement which can provide good operability to a conference participant. In addition, the operability of the system is improved to a further extent by improving an image input apparatus.

13 Claims, 27 Drawing Sheets

DIRECTION OF PANNING

DIRECTION OF TILTING

DIRECTION OF PANNING

FIG.19(a)
FIG.19(b)
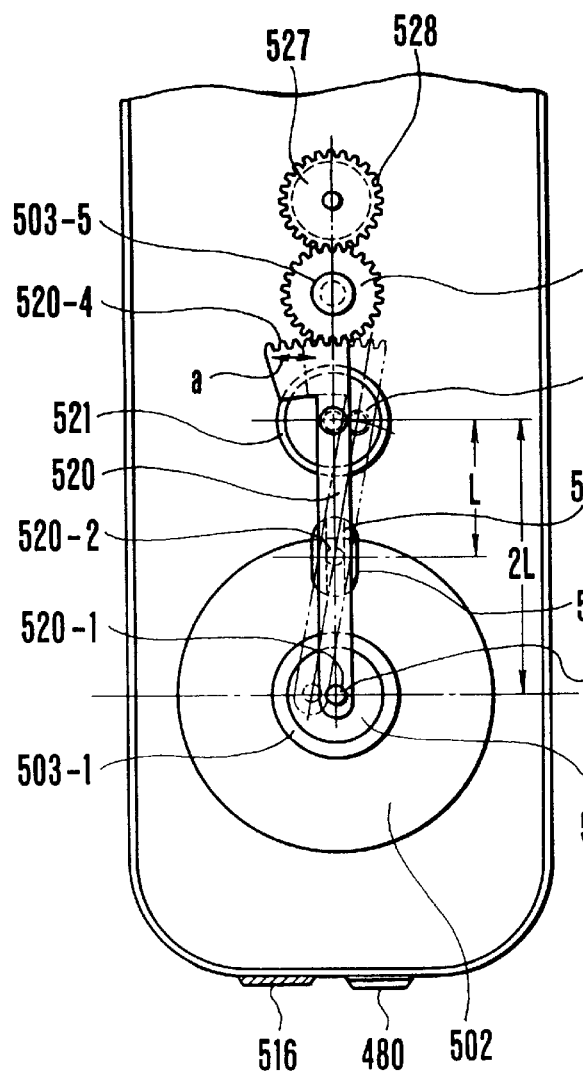
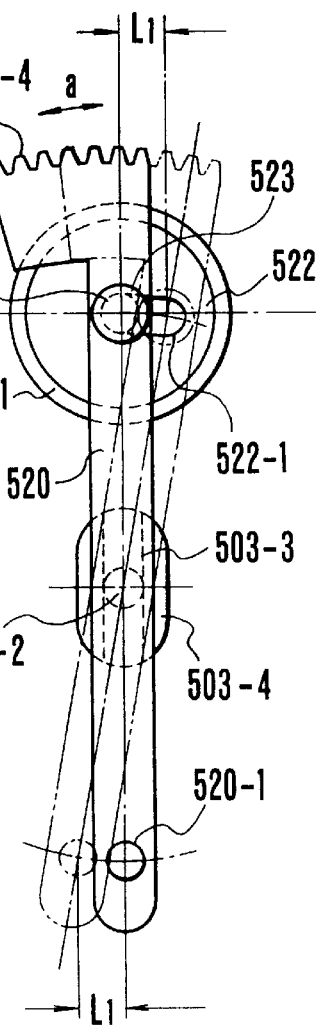

TV CONFERENCE SYSTEM AND TERMINAL EQUIPMENT FOR USE IN THE SAME

This application is a division of application Ser. No. 08/375,269, filed Jan. 19, 1995, which is now U.S. Pat. No. 5,636,039 a continuation of Ser. No. 07/938,425, filed Aug. 31, 1992, abandoned.

BACKGROUND OF THE INVENTION

1. Field of the Invention

The present invention relates to a remote control system for a TV conference system which enables a conference to be conducted between remotely located points, and to terminal equipment suitable for use with the remote control system.

2. Description of the Related Art

A conventional example of a TV conference system will be described below with reference to FIG. 1.

In a typical TV conference, to conduct a conference between remotely located points, it is necessary to communicate information indicating how remote participants stand, between the remotely located points. To this end, the following terminal equipments are employed: a TV camera 1 for imaging a conference participant or others in a station where this conference participant is present (hereinafter referred to simply as the "present station"), an electronic OHP (overhead projector) 2 which is an image input apparatus for imaging a still object as a still image or the like, a VTR (video tape recorder) 3 for reproducing edited video information to be transmitted to a station situated at a remote location (hereinafter referred to simply as the "remote station"), an operating part 4 made up of a keyboard, a digitizer and the like, a main monitor 5 for displaying a moving image transmitted from the remote station, a sub-monitor 6 for displaying an image supplied from the electronic OHP 2 or an image supplied from the TV camera 1, a microphone 7, and a loudspeaker 8. Each of the aforesaid equipments can operate under control of a controlling part 20. Information from the remote station or information from the present station is communicated via a communication interface part 9 and a line 10.

FIG. 2 is an explanatory view showing the essential parts of the conventional example shown in FIG. 1. A control signal 11 for controlling the panhead of the TV camera 1 is transmitted from the controlling part 20 to the TV camera 1, while information 12 indicative of a video output, the position of the panhead and the like is transmitted from the TV camera 1 to the controlling part 20. Video information 13 is transmitted from the electronic OHP 2 to the controlling part 20. Video information 14 is communicated between the VTR 3 and the controlling part 20.

As one example of the terminal equipments used in the TV conference system shown in FIGS. 1 and 2, a TV camera is proposed whose zooming, direction or the like can be operated under remote control. However, if TV cameras are employed on both transmitting and receiving sides in the TV conference system, there are a number of problems. For example, since the TV camera on the receiving side can be operated over the physically movable area of its camera panhead under the remote control of the transmitting side, a portion which the receiving side does not desire to show may enter the image field of the TV camera on the receiving side, and information about the portion may be transmitted to the transmitting side.

In the field of electronic OHPs, as well known, it has not yet been proposed to provide an arrangement for making it possible to operate an electronic OHP under remote control. In addition, it has not yet been proposed to provide an electronic OHP having a camera part or an original-supporting base which is freely movable to the extent that remote control can be realized.

SUMMARY OF THE INVENTION

It is, therefore, an object of the present invention to solve the above-described problems.

Another object of the present invention is to provide a TV conference system which includes an improvement capable of coping with an erroneous operation due to a conference participant, thereby providing good operability to the conference participant.

Another object of the present invention is to improve the operability of an image input apparatus for providing image information about an original or the like prepared for presentation purpose to a conference participant, thereby improving the operability of the TV conference system to a further extent.

To achieve the above and other objects, according to one aspect of the present invention, there is provided a TV conference system which enables a conference to be conducted between remotely located points and which comprises a plurality of terminal equipments disposed in the remotely located points for enabling information, such as image information and sound information, to be communicated from one of the remotely located points to another in real time, controlling means for enabling the terminal equipment disposed in one of the remotely located points to be controlled from another, and operation restricting means for restricting execution of a predetermined operation of the terminal equipment which can be operated under remote control.

According to another aspect of the present invention, as an image input apparatus for use in the above-described TV conference system, there is provided an image input apparatus which comprises a base on which an original having an image to be inputted is to be placed, a first support arm joined to the base, a second support arm turnably secured to the first support arm, and a camera head secured to the second support arm, a close-up lens unit turnably secured to one end of the camera head in a pivotably urged manner. The first support arm and the close-up lens unit cooperate to constitute an attachment cancelling mechanism for cancelling attachment of the close-up lens unit to the camera head by causing the second support arm to turn to a particular position.

According to another aspect of the present invention, there is provided an image input apparatus having another arrangement, which comprises a base on which an original having an image to be inputted is to be placed, an imaging part having a photoelectric conversion part for converting into an electrical signal the image inputted from the original placed on the base, and a support member for supporting the imaging part. The imaging part is turnably secured to the support member in such a manner that an optical axis of the imaging part draws a circular locus.

According to another aspect of the present invention, there is provided an image input apparatus having another arrangement, which comprises a lock mechanism capable of locking a vertical support part to inhibit turning thereof. When the horizontal support part is folded, the lock mechanism is unlocked by a projecting portion provided adjacent to the turning pivot of the horizontal support part.

According to another aspect of the present invention, there is provided an image input apparatus which can be operated under remote control using a wireless remote controller, in which a light receiving sensor part for receiving light transmitted from the wireless remote controller is arranged for movement into and out of the support member.

According to another aspect of the present invention, there is provided an image input apparatus which can be operated under remote control using a wireless remote controller, in which a light receiving sensor part for receiving light transmitted from the wireless remote controller includes a light receiving member and a mount for holding the light receiving member. The support member has a recess portion for accommodating the light receiving sensor part in such a manner that the light receiving sensor part is capable of being erected from the support member by being turned or slid with one end of the mount in engagement with the recess portion.

The above and other objects, features and advantages of the present invention will become apparent from the following detailed description of preferred embodiments of the present invention, taken in conjunction with the accompanying drawings.

BRIEF DESCRIPTION OF THE DRAWING

FIGS. 19(a) and 19(b) are cross-sectional views of a portion of the apparatus as viewed from the front thereof in the direction of the arrow A shown in FIG. 18;

DETAILED DESCRIPTION OF THE PREFERRED EMBODIMENTS

Preferred embodiments of the present invention will be described below with reference to the accompanying drawings.

Figure 1:
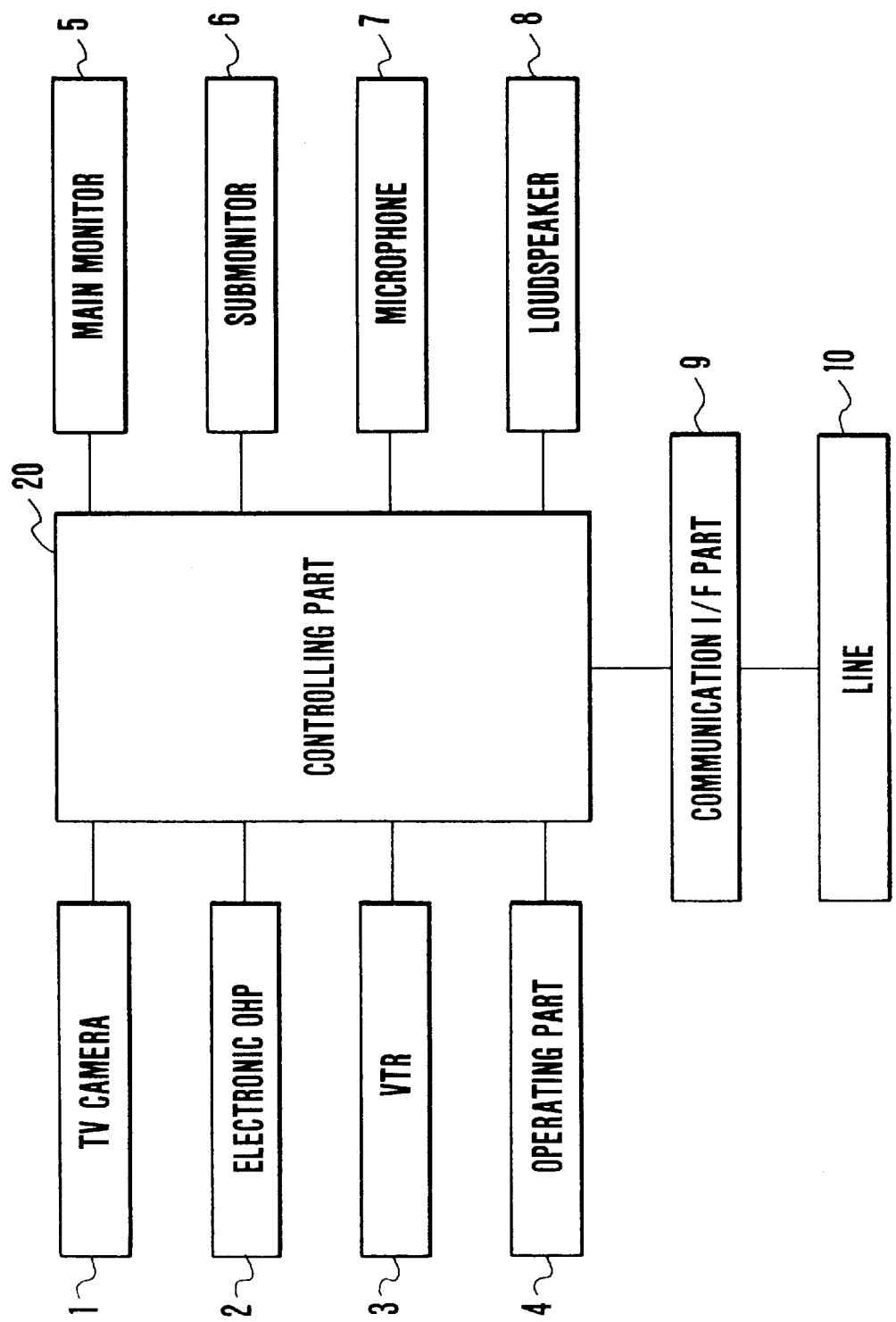
FIG. 1 is a schematic explanatory view showing an example of a conventional TV conference system.
Figure 2:
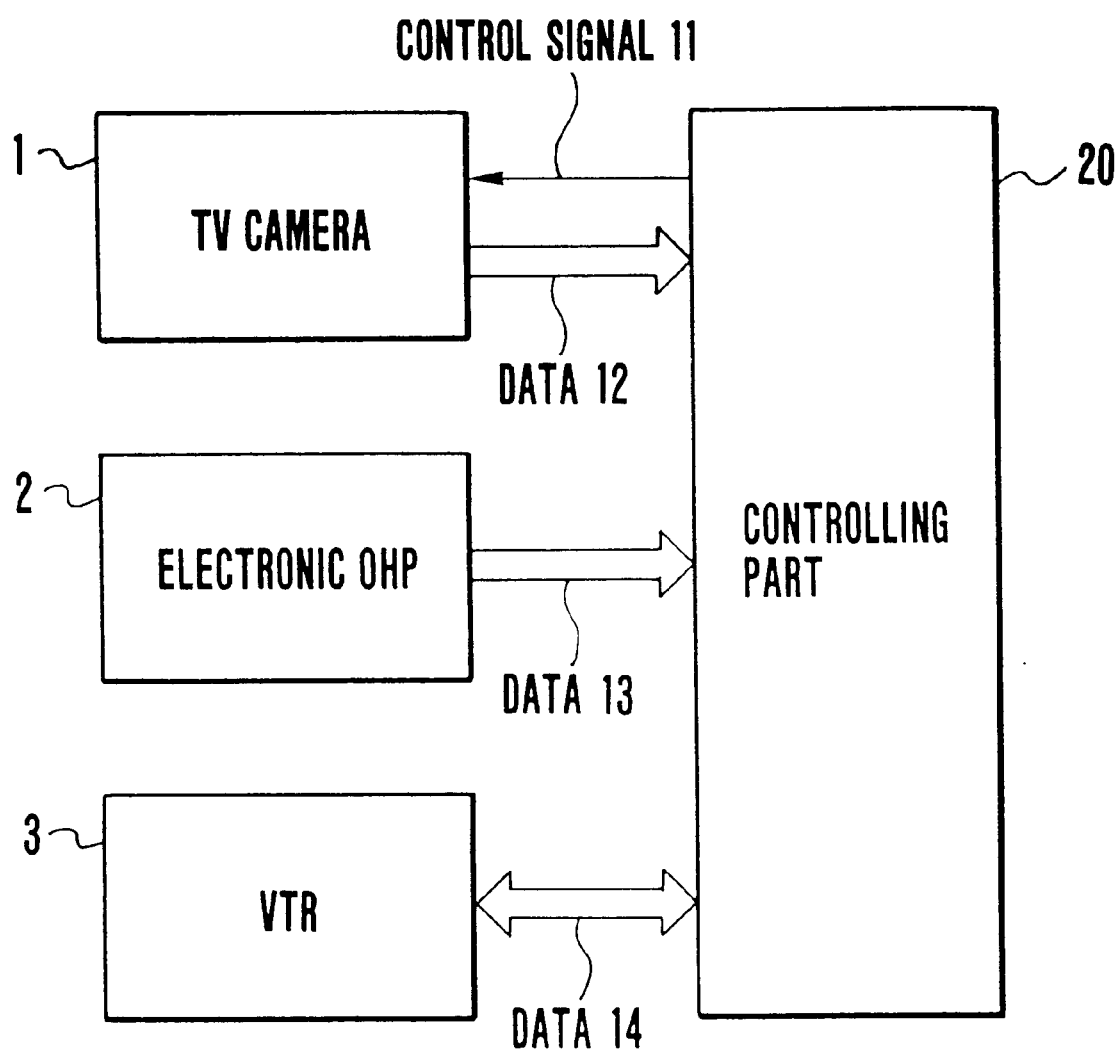
FIG. 2 is a schematic explanatory view showing the essential parts of the conventional example shown in FIG. 1.
Figure 3:
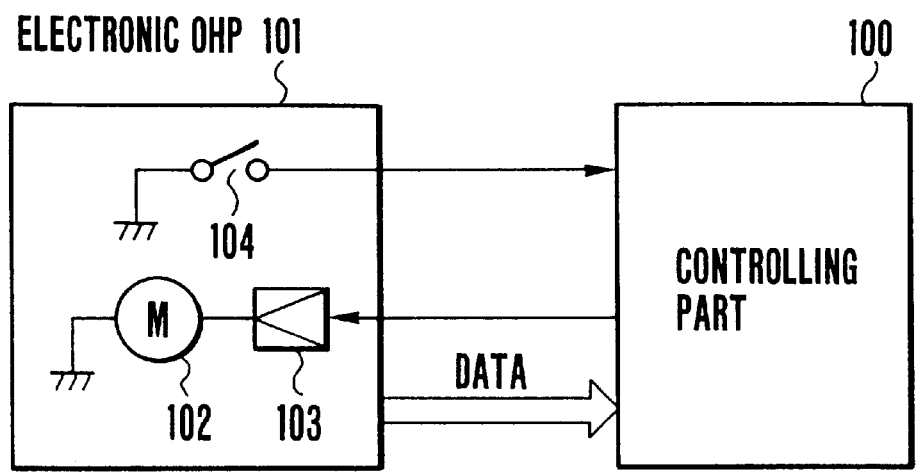
FIG. 3 is a schematic block diagram showing the essential parts of one embodiment of the present invention.

FIG. 3 is a block diagram schematically showing the essential parts of a first embodiment of the present invention.

The arrangement shown in FIG. 3 includes an electronic OHP 101 which is an image input apparatus, as well as a motor 102. Although the motor 102 is shown as a single motor for the sake of simplicity of explanation, the number of motors 102 may not restrict the number of motors which are actually used in the electronic OHP 101. For example, in the electronic OHP 101 shown in FIG. 3, the motor 102 corresponds to any one of motors which are not shown, such as a zooming motor (not shown), an autofocus motor (not shown) and an iris motor (not shown) which are provided in a camera part 111 of the electronic OHP 101 (refer to FIG. 4). Otherwise, the motor 102 corresponds to any one of motors, such as a motor (not shown) for driving rubber rollers 114 and 115 to move an original which will be described later (refer to FIG. 4), and a motor (not shown) for driving the camera part 111 to cause it to perform a turning motion.

The arrangement shown in FIG. 3 also includes a motor driving circuit 103 for driving the motor 102, and a switch (operation inhibit switch) 104 for restricting remote control to be exercised over the electronic OHP 101 which is an image input apparatus.

Figure 4:
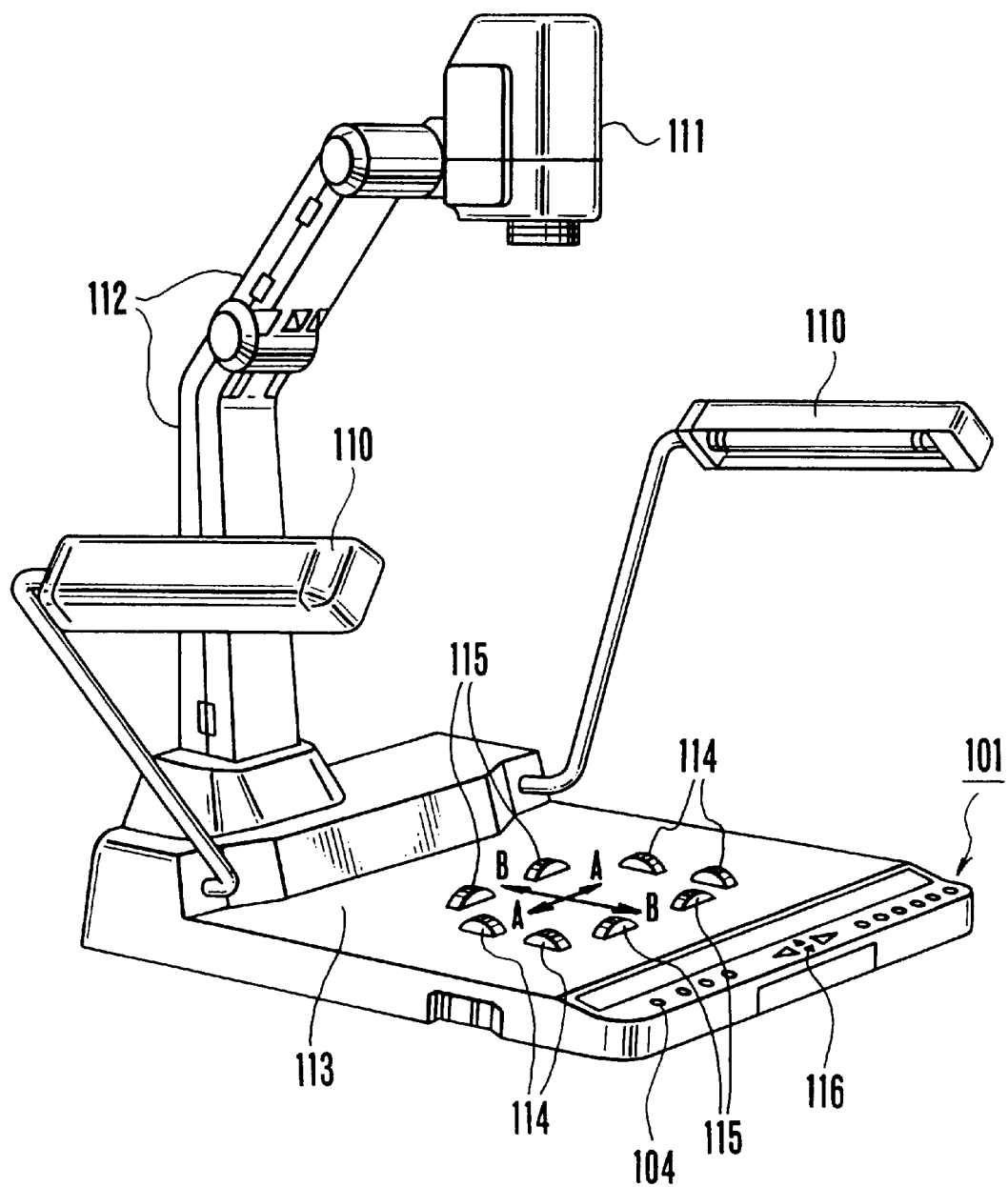
FIG. 4 is a diagrammatic, perspective view showing one example of an image input apparatus for use in the embodiment shown in FIG. 3.

One example of the electronic OHP 101 of FIG. 3 is shown in FIG. 4. The electronic OHP 101 shown in FIG. 4 includes illuminating means 110 for projecting light onto an original (not shown) placed on a base 113, the camera part 111, a support arm assembly 112 for supporting the camera part 111, and the rubber rollers 114 and 115. The rubber rollers 114 and 115 are disposed in such a manner that they project from the top surface of the base 113 to a small extent as shown in FIG. 4. In the shown embodiment, if an operator directly operates an operating switch 116 or remote control is exercised from a remote place, a motor (not shown), which is provided in the inside of the base 113, is driven to rotate the rubber rollers 114 and 115, thereby causing the original (not shown) placed on the base 113 to selectively move in the directions indicated by the respective double-headed arrows A and B shown in FIG. 4. In this manner, a desired portion of the original can be imaged through the camera part 111.

Figure 5:
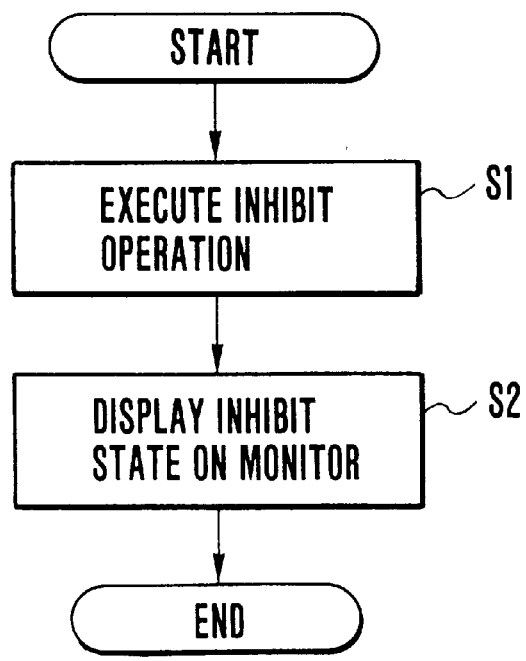
FIG. 5 is a flowchart showing the operation of providing a visual display on a monitor.

During a conference with a remote participant, which is conducted by using the TV conference system having the arrangement shown in FIG. 3, if an operator at the present station operates the operation inhibit switch 104 of the electronic OHP 101 as required, the remote station is inhibited from exercising remote control over the electronic OHP 101 disposed at the present station. Simultaneously, as shown in the flowchart of FIG. 5, the operation of the electronic OHP 101 under remote control is inhibited (Step S1), and the operation inhibit state is visually displayed on a monitor (Step S2).

Another embodiment of the present invention will be described below with reference to FIGS. 6 and 7.

Figure 6:
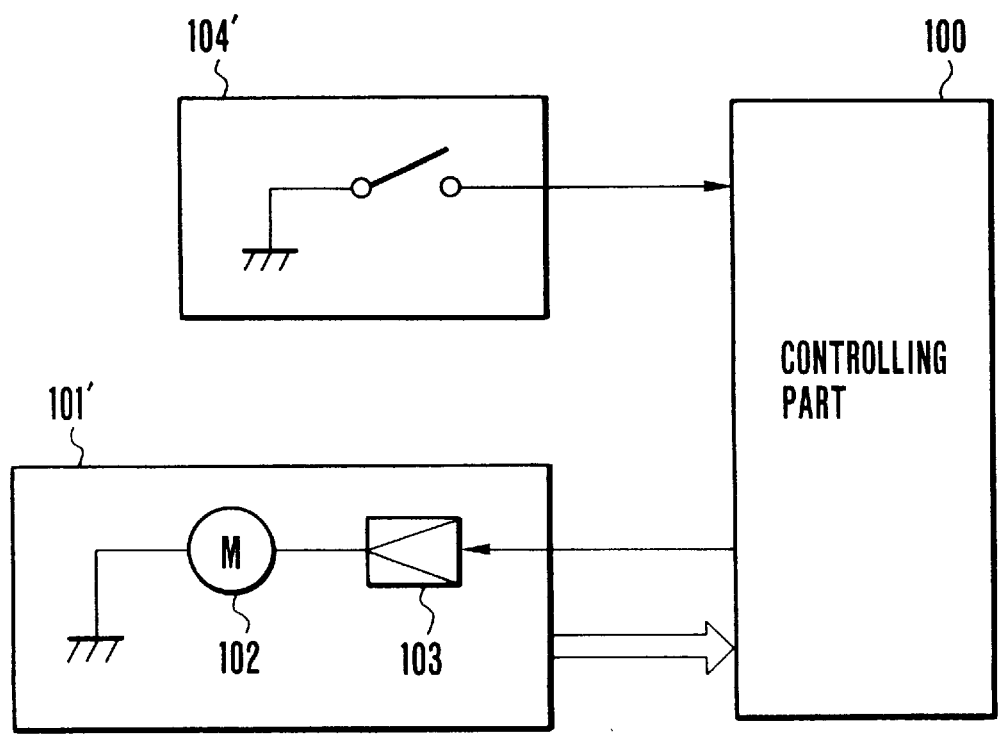
FIG. 6 is a schematic block diagram showing the essential parts of another embodiment of the present invention.

In the embodiment shown in FIG. 6, the controlling part 100 is provided with an operation inhibit switch 104' for inhibiting the remote control operation of an electronic OHP 101'. The operation inhibit switch 104' may be provided as a dedicated, independent switch like the operation inhibit switch 104 used in the embodiment shown in FIG. 4, or the function of the operation inhibit switch 104' may be realized by a keyboard input operation.

In the aforesaid arrangement, if the operation of the electronic OHP 101 under remote control is inhibited, the operation inhibit state is unconditionally visually displayed on the monitor. However, the arrangement of the embodiment is not limited to the aforesaid one. For example, it is also possible to adopt an arrangement in which only when an operator is to operate an electronic OHP whose remote control operation is inhibited, the operation inhibit state is visually displayed on the monitor. A flowchart for realizing the operation of such an arrangement is shown in FIG. 7.

Figure 7:
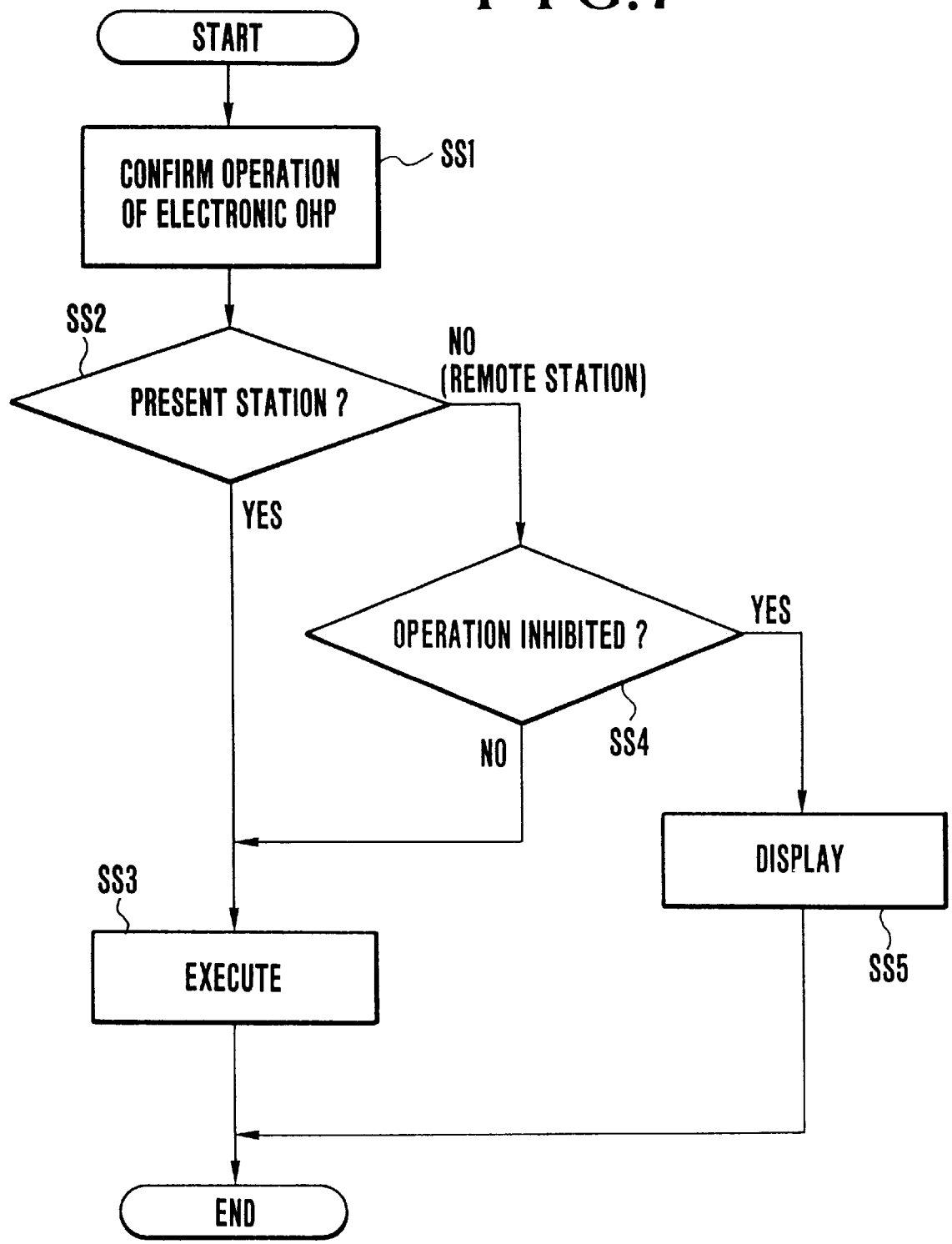
FIG. 7 is a flowchart showing the operation of providing a visual display on a monitor in the embodiment shown in FIG. 6.

In the flowchart shown in FIG. 7, if the occurrence of an operation of a particular electronic OHP is confirmed (Step SS1), it is determined whether the particular electronic OHP belongs to the present station or the remote station (Step SS2). If it is determined that the particular electronic OHP belongs to the present station, the operation is executed (Step SS3). If it is determined that the particular electronic OHP belongs to the remote station, it is determined whether the operation of the electronic OHP at the remote station is inhibited (Step SS4). If it is determined that the operation is not inhibited, the process returns to Step SS3 and the operation is executed as specified. If it is determined that the operation is inhibited, a visual display is provided which indicates that the operation of the electronic OHP under remote control is inhibited (Step SS5).

As described above, in the embodiment shown in FIG. 7, after a particular electronic OHP has been operated, it is possible to determine whether the operation of the particular electronic OHP under remote control is impossible. In addition, it is possible to adopt an arrangement which can provide, independently of this processing, a visual display indicating whether the operation of the particular electronic OHP under remote control is possible or impossible, in response to the operation of a keyboard or the like. In either case, by confirming a visual display indicative of the operation inhibit state on the monitor, the operator can obtain information indicating whether the operation of the electronic OHP under remote control is impossible. Accordingly, the operator can cancel or newly set the state where the operation of the electronic OHP under remote control is made impossible, as required.

In the description of each of the aforesaid embodiments, reference has been made to the example in which operation control exercised from a remote station can be inhibited. However, if it is necessary to prevent a conference participant at the present station from performing an erroneous operation, a switch for restricting execution of an operation occurring at the present station may be provided. Otherwise, the execution of an operation occurring at the present station may be restricted in association with an operation of the switch 104 (104').

In each of the aforesaid embodiments, reference has been made to the example in which the remote control operation of the electronic OHP can be inhibited. However, any of the above-described arrangements can be applied to a terminal equipment other than the electronic OHP; for example, it is possible to inhibit the remote control operation of a general VTR. In addition, any of the above-described arrangements can be utilized to control each part of a TV camera for imaging a conference participant, such as a panhead, a focusing system, an iris system and a zoom system. For example, a similar operation inhibit arrangement may be applied to the TV camera in the following manner: If there is a particular portion which is not desired to be photographed or a particular conference participant who is not desired to be photographed (for example, an adviser who is giving an instruction to a speaking participant, sitting adjacent to him/her), an operation inhibit switch may be operated so that a remote station is inhibited from operating the TV camera. In addition, control can also be realized which allows the TV camera to be moved within only a predetermined range. Such control can be achieved, as by inputting a movable-area limit command and specifying a movable area (such as a tilting angle and a panning angle) through, for example, a keyboard. An operation executed during the control will be described below in outline with reference to FIG. 8.

Figure 8:
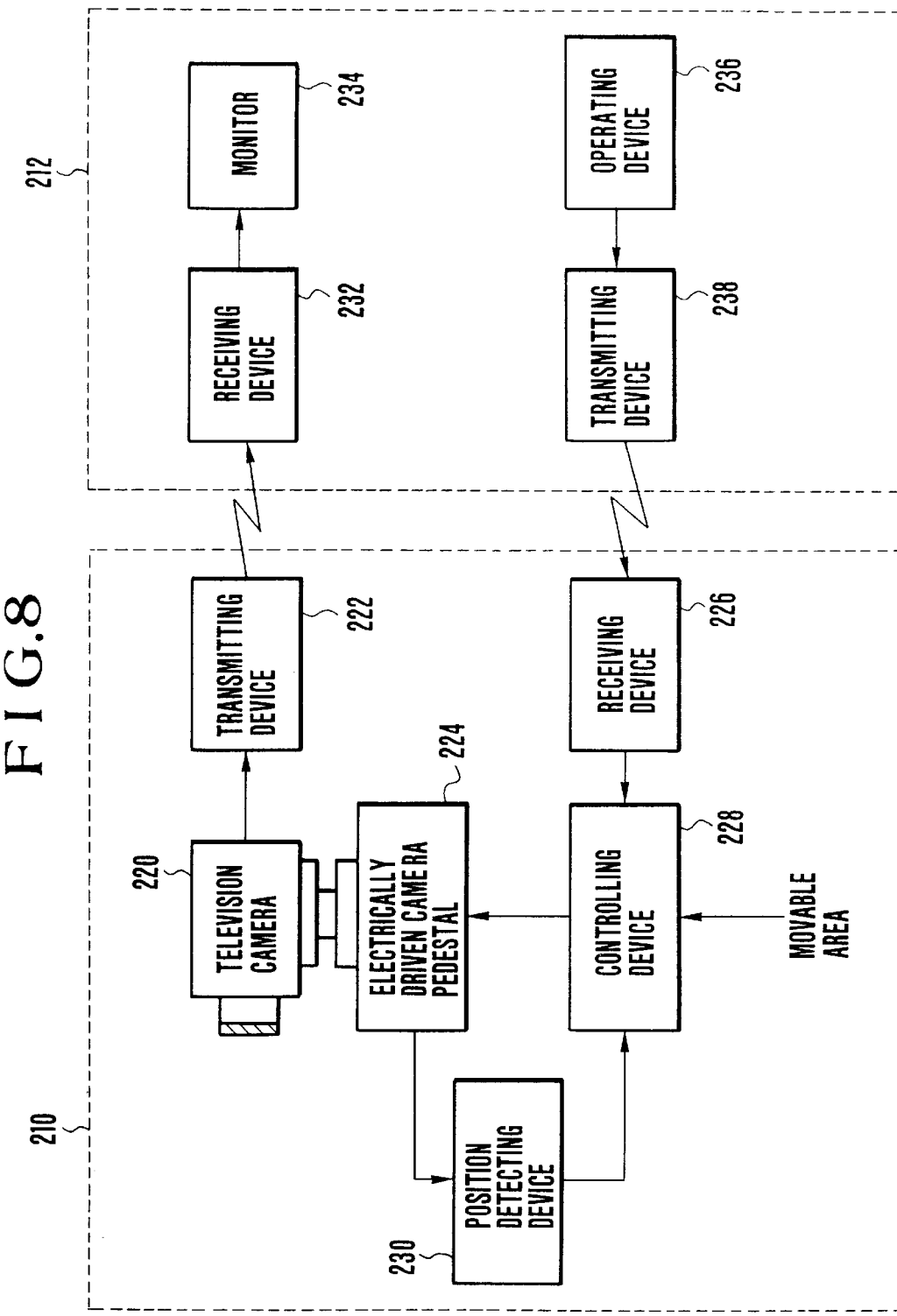
FIG. 8 is a schematic block diagram showing another embodiment employing a TV camera.

FIG. 8 is a block diagram schematically showing an embodiment for realizing the above-described control. For the sake of simplicity, in the following description, reference will be made to a TV conference between two participants who use terminal systems 210 and 212, respectively.

In FIG. 8, the terminal system 210 is shown as a circuit block which serves as an image transmitting side, while the terminal system 212 is shown as a circuit block which serves as an image receiving side. In a practical arrangement, the terminal system 210 is provided with equipments 232, 234, 236 and 238 included in the terminal system 212, while the terminal system 212 is provided with equipments 220, 222, 224, 228 and 230 included in the terminal system 210.

In the terminal system 210, an image photographed by the television camera 220 is transmitted from the transmitting device 222 to the terminal system 212. The television camera 220 is placed on an electrically driven camera pedestal 224. When the receiving device 226 receives a control signal for the camera 220 from the terminal system 212, the receiving device 226 applies the control signal to the controlling device 228, and the controlling device 228 controls the electrically driven camera pedestal 224 in accordance with the control signal.

During this time, the position detecting device 230 consistently detects the position of the electrically driven camera pedestal 224 and supplies detected-position information to the controlling device 228. The controlling device 228 makes reference to information indicative of a preset movable area (or a photography inhibit area) and the detected-position information provided by the position detecting device 230, thereby controlling the electrically driven camera pedestal 224 within the movable area in accordance with the control signal transmitted from the terminal system 212.

In the terminal system 212 which serves as the image receiving side, the receiving device 232 receives an image transmitted from the terminal system 210 and displays the received image on the monitor 234. The direction, magnification, etc., of the camera 220 in the terminal system 210 which serves as the image transmitting side can be controlled by means of the operating device 236, and an associated control signal is transmitted to the terminal system 210 via the transmitting device 238.

Although the outline of the embodiment shown in FIG. 8 has been described above, the structure of each individual part will be described below with reference to FIGS. 9 to 11.

Figure 9:
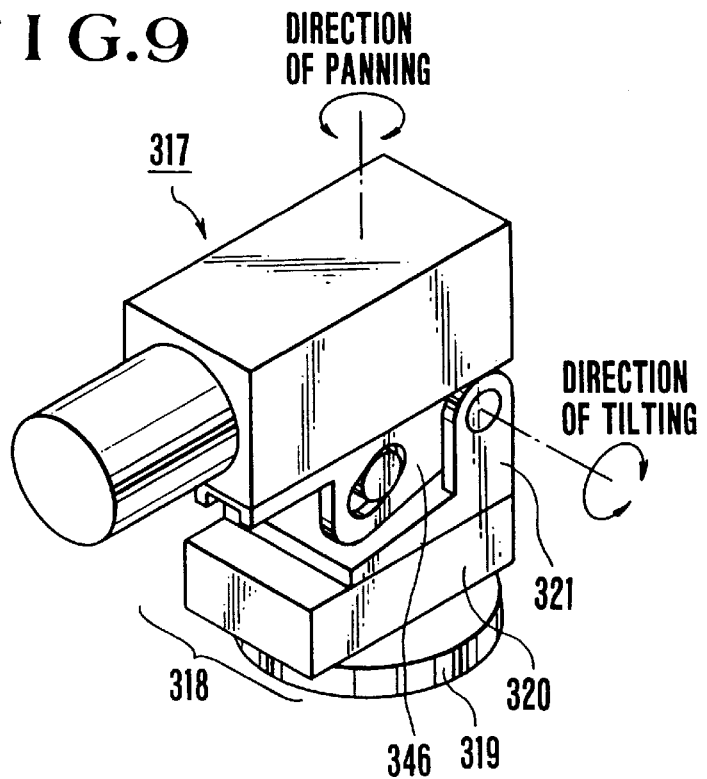
FIG. 9 is a diagrammatic, perspective view showing the arrangement of the TV camera and a panhead which are used in the embodiment shown in FIG. 8.

FIG. 9 shows a TV camera which is used in a TV conference for photographing a participant. A TV camera 317 is supported on a panhead 318 for turning motion in the horizontal and vertical directions, and is operated in the direction of panning or tilting in accordance with a control signal transmitted from the controlling part 228 (FIG. 8) or 100 (FIG. 3) disposed in the TV conference system. To realize this operation, the panhead 318 comprises a base 319 for supporting all the elements placed thereon, a panning member 320 rotatably supported on the base 319, a tilting member 321 mounted on the top surface of the panning member 320, and a camera mounting plate 346 rotatably mounted on the tilting member 321. The TV camera 317 is fixed to the camera mounting plate 346.

Figure 10:
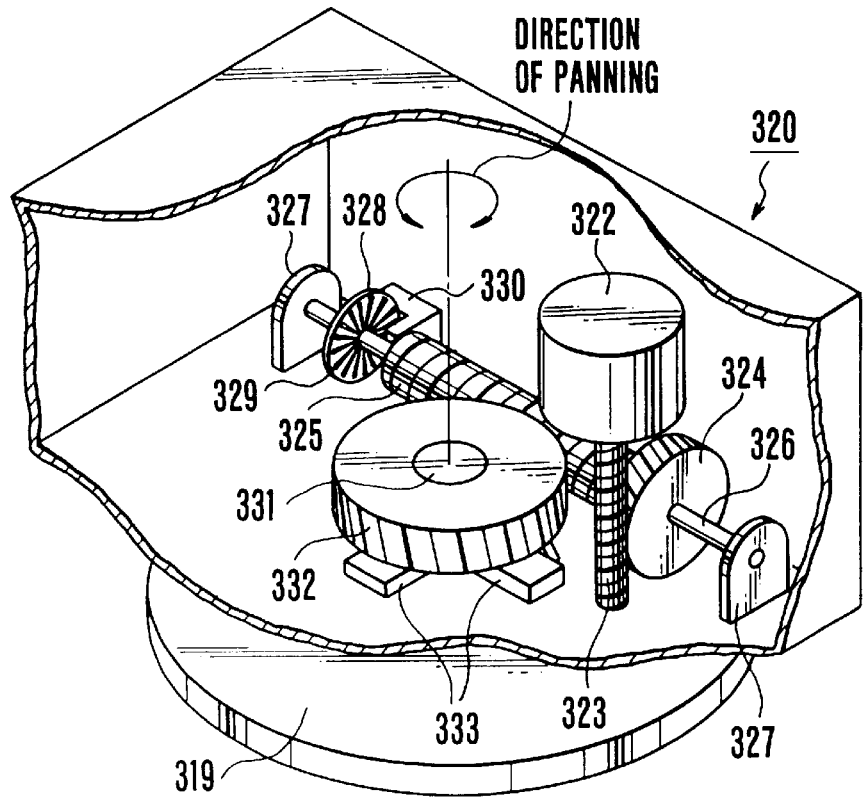
FIG. 10 is a schematic view showing the mechanism of the panning member of the panhead of FIG. 9.
Figure 11:
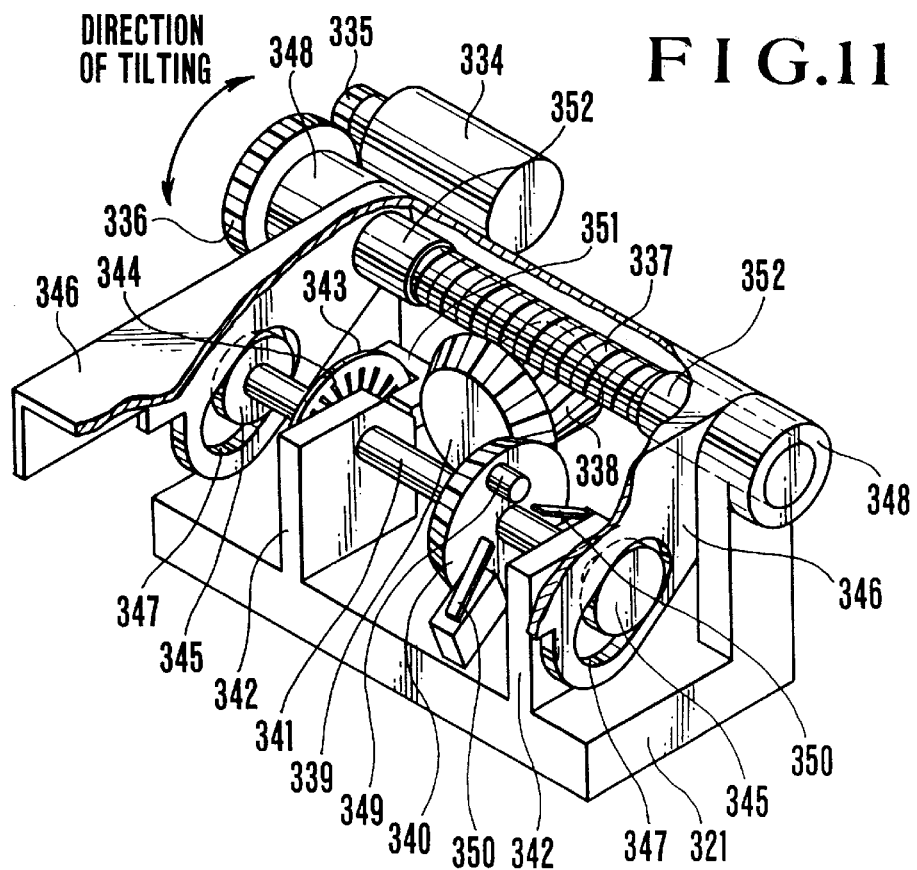
FIG. 11 is a schematic view showing the mechanism of the tilting member the panhead of FIG. 9.

FIG. 10 is a schematic view showing the structure of the panning member 320 for causing the panhead 318 of FIG. 9 to perform a panning operation, and FIG. 11 is a schematic view showing the structure of the tilting member 321 for causing the panhead 318 to perform a tilting operation.

The panning member 320 shown in FIG. 10 includes a motor 322, a worm gear 323 press-fitted onto a spindle (not shown) of the motor 322, a helical gear 324 engaged with the worm gear 323, a worm gear 325 rotatable integrally with the helical gear 324, a rotating shaft 326 integrally combined with the helical gear 324 and the worm gear 325, bearings 327 for the rotating shaft 326, a disk 328 rotatable integrally with the rotating shaft 326 and provided with a multiplicity of slits 329, and a transmission type of photointerrupter 330. During the rotation of the disk 328, the slits 329 crosswise pass through the optical path of light transmitted from the photointerrupter 330, whereby transmission and interception of the light are successively repeated. The photointerrupter 330 detects a signal thus generated and transmits it to a counter (not shown). The panning member 320 also includes a shaft 331 uprightly mounted on the base 319, and a helical gear 332 engaged with the worm gear 325 and fixed to the shaft 331. The base 319, the shaft 331 and the helical gear 332 are integrally assembled. If the panning member 320 turns in the direction of panning as will be described later, a cam pin (not shown), which perpendicularly projects from the bottom surface of the helical gear 332 in the downward direction, actuates microswitches 333. The operational limit positions between which the panning member 320 is allowed to turn in the direction of panning are detected through the actuation of the respective microswitches 333. These microswitches 333 can also be used to set the initial position of the panning member 320.

In the above-described arrangement, when the motor 322 is driven in accordance with a control signal supplied from the controlling part 228 (FIG. 8), the rotational force of the motor 322 is transmitted along a gear train made up of the worm gear 323, the helical gear 324, the worm gear 325, and the helical gear 332. The helical gear 332 is immovable because it is assembled integrally with the base 319, so that the panning member 320 turns about the axis of the helical gear 332. In this operation, the cam pin (not shown) actuates the microswitches 333 so that the initial position and the operational limit positions of the panning member 320 can be detected. In addition, the angle of rotation of the panning member 320 can be detected from a signal transmitted from the photointerrupter 330, whereby it is possible to practice control of the angle of rotation of the panning member 320 on the basis of information indicative of the detected angle of rotation.

FIG. 11 is a schematic view showing the structure of the tilting member 321 which is mounted on the panning member 320 in the above-described manner.

The arrangement shown in FIG. 11 includes a motor 334, a spur gear 335 press-fitted onto a spindle (not shown) of the motor 334, a spur gear 336 engaged with the spur gear 335, and a worm gear 337 rotatable integrally with the spur gear 336. The worm gear 337 is rotatably supported at its opposite ends by bearing portions 348 of the tilting member 321. The shown arrangement also includes a helical gear 338 engaged with the worm gear 337, a bevel gear 339 rotatable integrally with the helical gear 338, and a bevel gear 340 engaged with the bevel gear 339 and provided with a cam pin 349, which axially projects from one side of the bevel gear 340. The cam pin 349 is disposed to selectively actuate microswitches 350 when the bevel gear 340 rotates. This arrangement makes it possible to detect the initial position or the operational limit positions of the tilting operation of the camera mounting plate 346 (to be described later) on which the camera 317 (FIG. 9) is mounted. The shown arrangement also includes a shaft 341 rotatable integrally with the bevel gear 340, bearings 342 disposed on the tilting member 321 for rotatably supporting the shaft 341, and a disk 343 rotatable integrally with the shaft 341 and provided with a multiplicity of slits 344, and a transmission type of photointerrupter 351. During the rotation of the disk 343, the slits 344 crosswise pass through the optical path of light transmitted from the photointerrupter 351, whereby transmission and interception of the light are successively repeated. The photointerrupter 351 detects a signal thus generated and transmits it to a counter (not shown). Elliptic cams 345 are fixed to the opposite ends of the shaft 341, respectively. The elliptic cams 345 are engaged with associated cam openings 347 formed in the camera mounting plate 346. Shafts 352 turnably support the camera mounting plate 346.

In the above-described arrangement, when the motor 334 is driven in accordance with a control signal supplied from the controlling part 228 (FIG. 8), the rotational force of the motor 334 is transmitted along a gear train made up of the spur gear 335, the spur gear 336, the worm gear 337, the helical gear 338, the bevel gear 339, the bevel gear 340, the shaft 341 and the elliptic cams 345. Since the elliptic cams 345 are engaged with the respective cam openings 347, the camera mounting plate 346 turns about the shafts 352 in the direction of tilting by the turn of the elliptic cams 345. In this operation, the initial position and the operational limit positions of the camera mounting plate 346 can be detected through the microswitches 350. In addition, the angle of rotation of the camera mounting plate 346 can be detected from a signal transmitted from the photointerrupter 351, whereby it is possible to practice control of the angle of rotation of the camera mounting plate 346 on the basis of information indicative of the detected angle of rotation.

As described above, the use of the panhead according to the embodiment described with reference to FIGS. 8 through 11 permits the TV camera 317 to be freely operated in the direction of panning or tilting, and the TV camera 317 can be controlled by the operation of a keyboard as described previously.

As is apparent from the above description, according to the embodiment described with reference to FIGS. 8 through 11, since operation restricting means is provided and a predetermined operation of terminal equipment is restricted as required, it is possible to prevent the terminal equipment from actuating due to an erroneous operation, so that it is possible to prevent unnecessary information from being provided to a remote conference participant. In consequence, each conference participant can take part in a TV conference without anxiety.

In addition, each conference participant can know whether the predetermined operation is inhibited, and can easily newly set the TV conference system so that another operation can be inhibited.

An improved version of the electronic OHP 101 which is an image input apparatus as shown in FIG. 3 will be described below. The improved version is intended to improve the operability of the above-described TV conference system.

Figure 12:
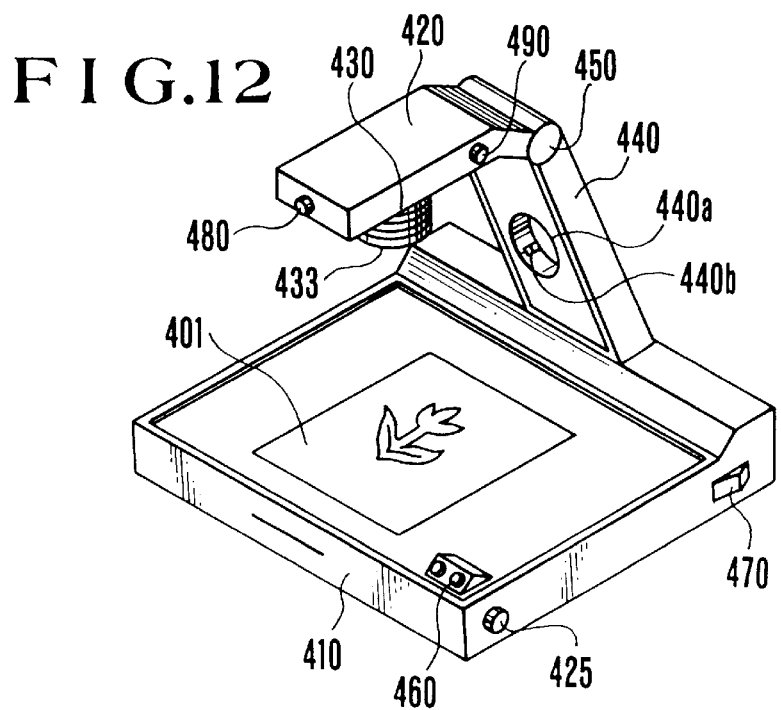
FIG. 12 is a diagrammatic, perspective view showing another embodiment of the present invention.
Figure 13:
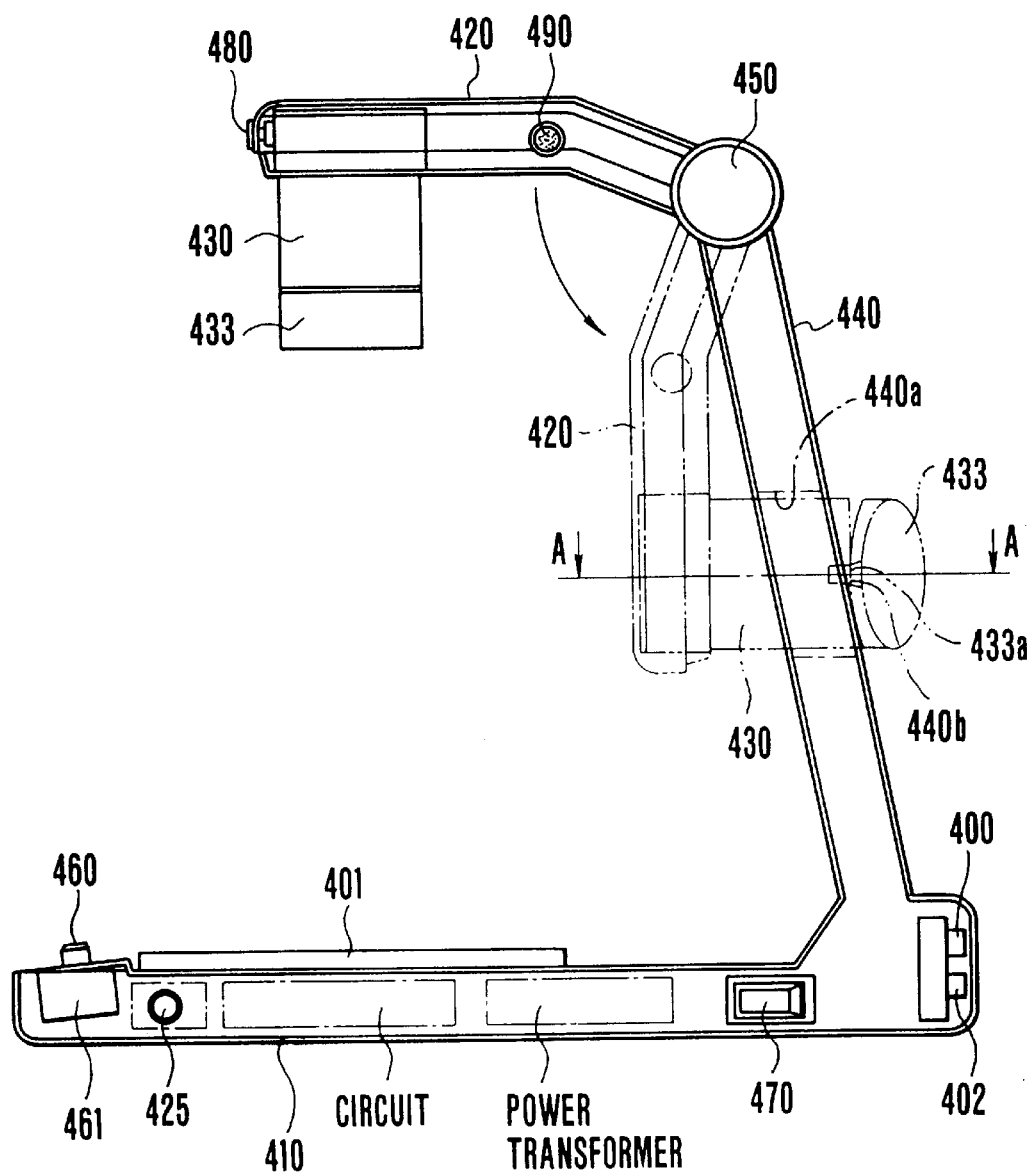
FIG. 13 is a diagrammatic, side elevational view showing the embodiment shown in FIG. 12.

FIGS. 12 and 13 respectively show, in perspective and in side elevation, an embodiment of the present invention. As shown, an original 401 is placed on a base 410. The surface of the base 410 that faces a camera head 430 is not colored but gray in order to adjust the white balance of the camera head 430 having an image sensor photoelectric conversion part for picking up an image from the original 401 or the like, converting the image into an electrical signal and outputting the electrical signal. The color of the surface of the base 410 that faces the camera head 430 may also be white. In this case, however, an excessive amount of light becomes incident on the photoelectric conversion part and the output of the photoelectric conversion part is saturated so that correct adjustment of the white balance may not be achieved. To prevent this phenomenon, gray is preferable to white because the reflectivity of gray is lower than that of white. The base 410 has a diffused-reflection plate so that light irregularly reflected from the base 410 is not incident on the camera head 430.

A switch 460 for switching a switch circuit 461 is provided in a distal end portion of the surface of the base 410 that faces the camera head 430. A power switch 470 is provided in a proximal end portion of one side of the base 410.

The camera head 430 is secured to a second support arm 420 and has a color photoelectric conversion part. A close-up lens unit 433 is attached to the forward end of the camera head 430. A first support arm 440 is approximately perpendicularly fixed at one end to the base 410. A turnable joint 450 is provided at the other end of the first support arm 440, and the second support arm 420 is secured for turning motion about the turnable joint 450. In use, the second support arm 420 is commonly positioned to extend approximately horizontally, while the camera head 430 is directly opposed to the base 410. The first support arm 440 is provided with an opening 440a so that if the second support arm 420 is turned toward the first support arm 440, the camera head 430 does not strike the first support arm 440, as well as so that the first support arm 440 does not obstruct the photographic area of the camera head 430.

When a switch member 480 for white balance adjustment is turned on, the white balance of the camera head 430 can be automatically adjusted. The switch member 480 may also be arranged in such a manner that when it is turned on, the characteristics of white balance adjustment can be manually changed according to the kind of ambient light, for example, light from a fluorescent tube, daylight, or light from an incandescent lamp. A lock cancel button 490 is provided for unlocking a mechanism (not shown) arranged to lock the second support arm 420 in a predetermined position.

A video output terminal 400 is provided for outputting a video signal inputted from the camera head 430, and the video output terminal 400 is connected to an input terminal of a monitor (not shown) by a cable so that the monitor can display a video image inputted from the camera head 430. An audio output terminal 402 is provided for outputting an audio signal inputted from an external microphone (not shown) connected to an external microphone terminal 425. The audio output terminal 425 is connected to an input terminal of a loudspeaker (not shown) by a cable so that the loudspeaker reproduces, as a sound output, an audio signal inputted from the external microphone.

An attachment cancelling mechanism for cancelling the attachment of the close-up lens unit 433, which constitutes a feature of the aforesaid embodiment, will be described below. Each of FIGS. 14 and 15 is an explanatory view of the operation of the attachment cancelling mechanism, and is a cross-sectional view taken along line A—A of FIG. 13.

When an image on the original 401 placed on the base 410 is to be inputted through the camera head 430, the close-up lens unit 433 is needed. However, if the second support arm 420 is turned to direct the camera head 430 in a particular direction for the purpose of inputting an image of a distant object or a character or picture drawn on a blackboard or the like, the close-up lens unit 433 is not needed. For this reason, the shown embodiment has a structure in which when the second support arm 420 is turned to a particular position, the close-up lens unit 433 attached to the forward end of the camera head 430 is shifted from the camera head 430.

Figure 14:
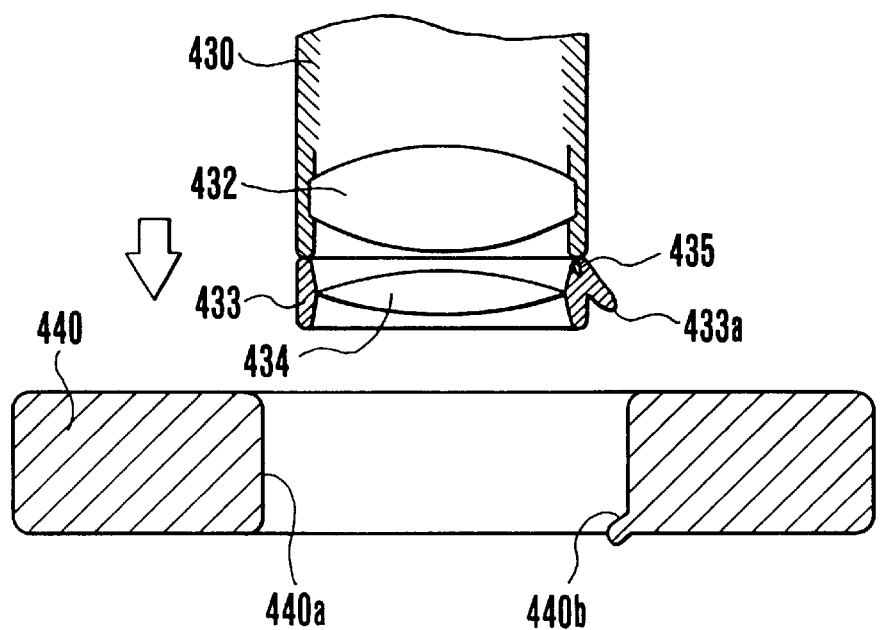
FIG. 14 is a schematic view aiding in explaining the operation of an attachment cancelling mechanism (an intermediate step of a turning operation)

FIG. 14 shows an intermediate state of the second support arm 420 which is being turned to a particular position. FIG. 15 shows the state in which the second support arm 420 has been completely turned up to the particular position.

Figure 15:
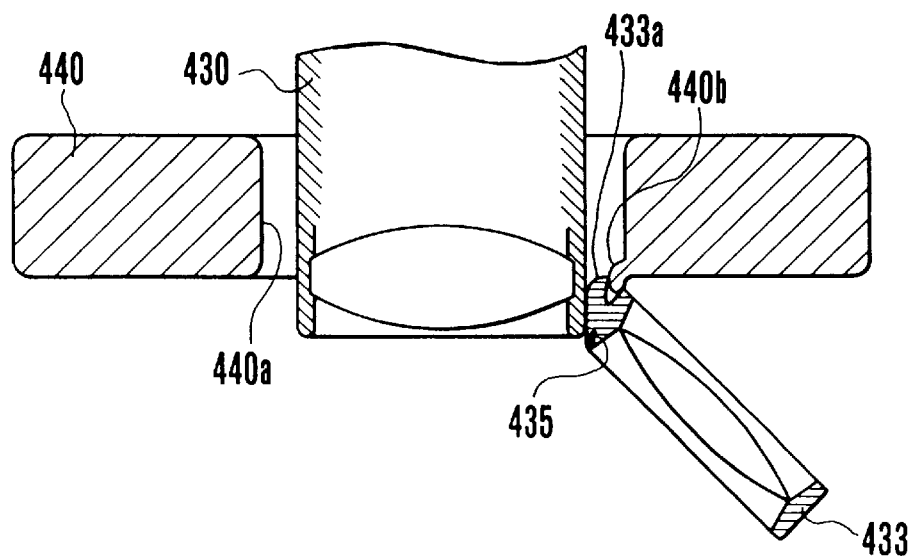
FIG. 15 is a schematic view aiding in explaining the operation of the attachment cancelling mechanism (the end of the turning operation)
Figure 16:
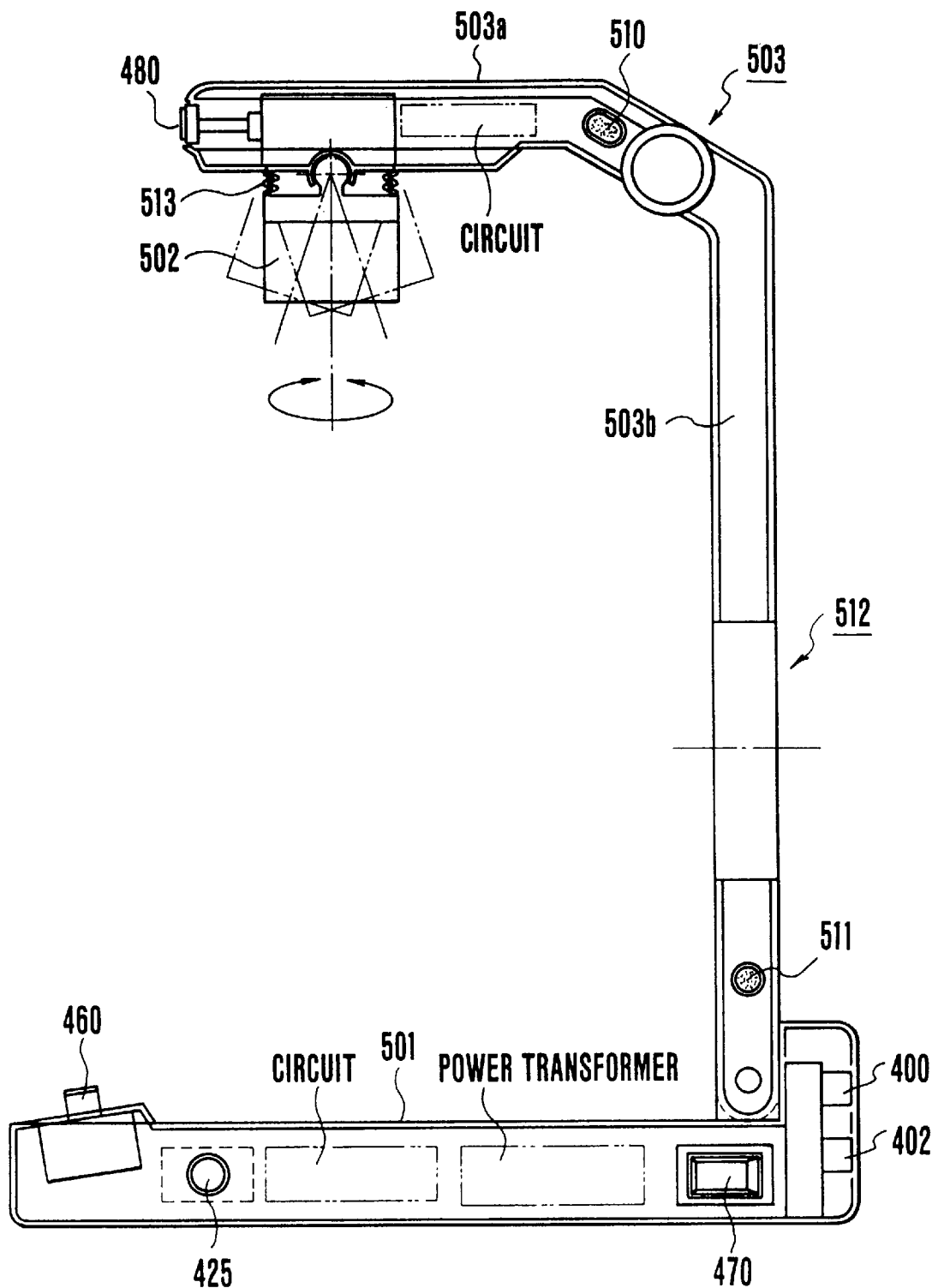
FIG. 16 is a diagrammatic, cross-sectional view of an image input apparatus, and shows a still another embodiment of the present invention.

Referring to FIGS. 14 and 15, the close-up lens unit 433 is attached to the forward end of the camera head 430 in such a manner that the close-up lens unit 433 is turnable on a turning pivot 435. In addition, the close-up lens unit 433 is consistently urged toward the camera head 430 by a coil spring (not shown) provided on the turning pivot 435. A projecting piece 433a is formed on a portion of the outer periphery of the close-up lens unit 433 in such a manner that the projecting piece 433a can engage with a projection 440b which is formed to project into the opening 440a of the first support arm 440.

When the second support arm 420 is turned to a predetermined extent, the projecting piece 433a comes into contact with the projection 440b. When the second support arm 420 is turned to a further extent, the projecting piece 433a engages with the projection 440b and turns on the turning pivot 435 against the urging force of the coil spring. Thus, the close-up lens unit 433 turns toward the outside of the imaging field of the camera head 430.

In the state in which the second support arm 420 has been completely turned up to the particular position, the close-up lens unit 433 is turned up to a position offset from the imaging field of the camera head 430 and is placed in an attachment-cancelled state. Accordingly, the camera head 430 can effect an image inputting operation without being hindered by the close-up lens unit 433.

When the second support arm 420 is turned upward, i.e., from a position corresponding to the attachment-cancelled state toward a position where the original 401 placed on the base 410 can be imaged, the projecting piece 433a of the close-up lens unit 433 comes out of the engagement with the projection 440b formed on the first support arm 440 and the close-up lens unit 433 is attached to the forward end of the camera head 430 by the urging force of the coil spring.

In the above-described embodiment, the attachment cancelling mechanism for the close-up lens unit 433 is made up of the projecting piece 433a provided on the close-up lens unit 433 and the projection 440b engageable with the projecting piece 433a, which is formed to project into the opening 440a of the first support arm 440. However, another arrangement capable of serving a similar function may be used. For example, the projecting piece 433a may be replaced with a sector gear, and a rack engageable therewith may be provided on the first support arm 440. In this arrangement, when the second support arm 420 is turned so that the camera head 430 is horizontally positioned, the sector gear and the rack engage with each other to turn the close-up lens unit 433.

As described above, in the image input apparatus according to the embodiment described with reference to FIGS. 12 through 15, the attachment of the close-up lens unit 433 is cancelled in interlocked relationship to the operation of causing the second support arm 420 to which the camera head 430 is secured to perform a particular turn with respect to the first support arm 440. When the second support art 420 is turned to an old position, the close-up lens unit 433 is automatically attached to the forward end of the camera head 430. Accordingly, it is possible to eliminate the conventional time-consuming operation required to attach or detach a close-up lens unit, for example, the operation of removing the close-up lens unit in order to stop inputting an image on an original placed on a base and input an image of an object other than the image on the original, or the operation of attaching the close-up lens unit in order to stop inputting an image of an object other than an image on an original placed on the base and input an image on the original. In addition, since it is possible to attach the close-up lens unit 433 precisely and reliably, it is possible to provide an image input apparatus which has a simple arrangement and which is convenient and easy to handle.

Another improved electronic OHP which is arranged to improve operability to a further extent will be described below with reference to FIGS. 16 to 19(a), 19(b). The following embodiment has a basic structure which is substantially identical to that of the embodiment shown in FIG. 12. Accordingly, the same reference numerals are used to denote elements which perform functions and operations similar to those of the embodiment shown in FIG. 12, and description thereof is omitted.

A feature of the following embodiment is that a camera 502 is secured to a horizontal support part 503a in such a manner that the camera 502 can turn while the optical axis thereof is drawing a circular locus. The structure of each support part is similar to that of the above-described embodiment. More specifically, the horizontal support part 503a is turnably secured to a vertical support part 503b which is in turn turnably secured to a base 501. A hole 512 is formed in the vertical support part 503b to prevent the vertical support part 503b from interfering with the camera 502 when the horizontal support part 503a is folded down.

Lock cancel buttons 510 and 511 serve to cancel the states of the respective horizontal and vertical support parts 503a and 503b being fixed in their predetermined positions.

Figure 17:
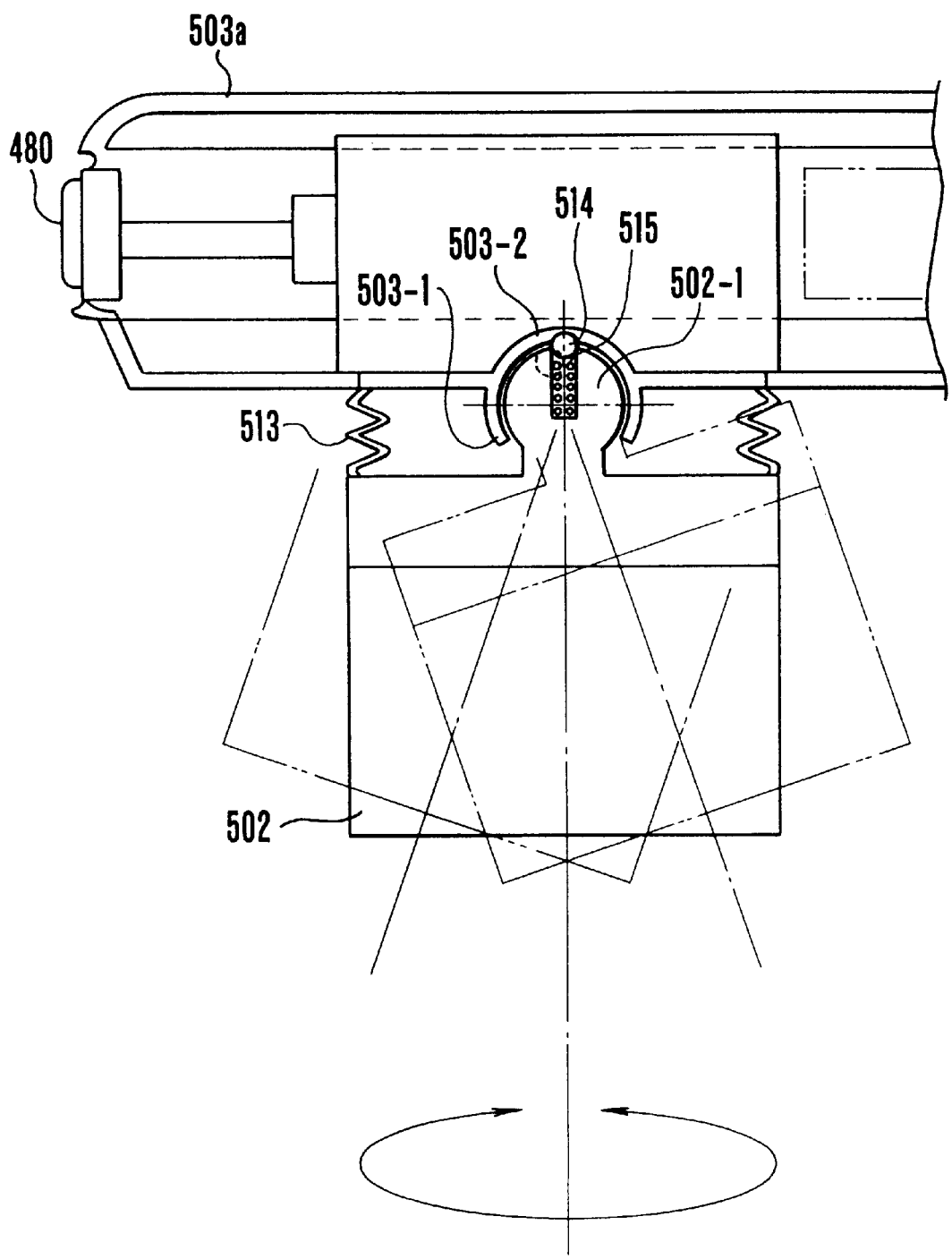
FIG. 17 is an enlarged, cross-sectional view of the image input apparatus according to the embodiment shown in FIG. 16.

FIG. 17 is an enlarged cross-sectional view of a portion for mounting the camera 502 on the horizontal support part 503a.

As shown in FIG. 17, a pivot 502-1 having a round shape is formed on the end of the camera 502 that is adjacent to the horizontal support part 503a. The pivot 502-1 is fitted into and held by a holding part 503-1 which is formed in the horizontal support part 503a to have an internal round shape, whereby the camera 502 can be turned in such a manner that the optical axis thereof draws a circular locus about the axis of the pivot 502-1. A ball 514 having a spherical shape is provided at the end of the pivot 502-1 which is positioned on a line extending from the optical axis of the camera 502. The ball 514 is consistently urged toward the holding part 503-1 by a spring 515. When the ball 514 engages with a recess 503-2 formed in the central portion of the holding part 503-1, the optical axis of the camera 502 is positioned perpendicularly to the base 501. If the camera 502 is turned, the ball 514 is disengaged from the recess 503-2 and pressed against the internal wall of the holding part 503-1 so that the camera 502 can be held at an arbitrary position. The holding part 503-1 is provided with fixing means (not shown) so that no matter where the camera 502 is located within its turnable range, the vertical or horizontal positional relationship of an image inputted into the camera 502 is never offset or inverted. A rubber bellows 513 is provided for improving an external appearance and for preventing foreign matter such as dust from entering a joining area between the camera 502 and the horizontal support part 503a.

Figure 18:
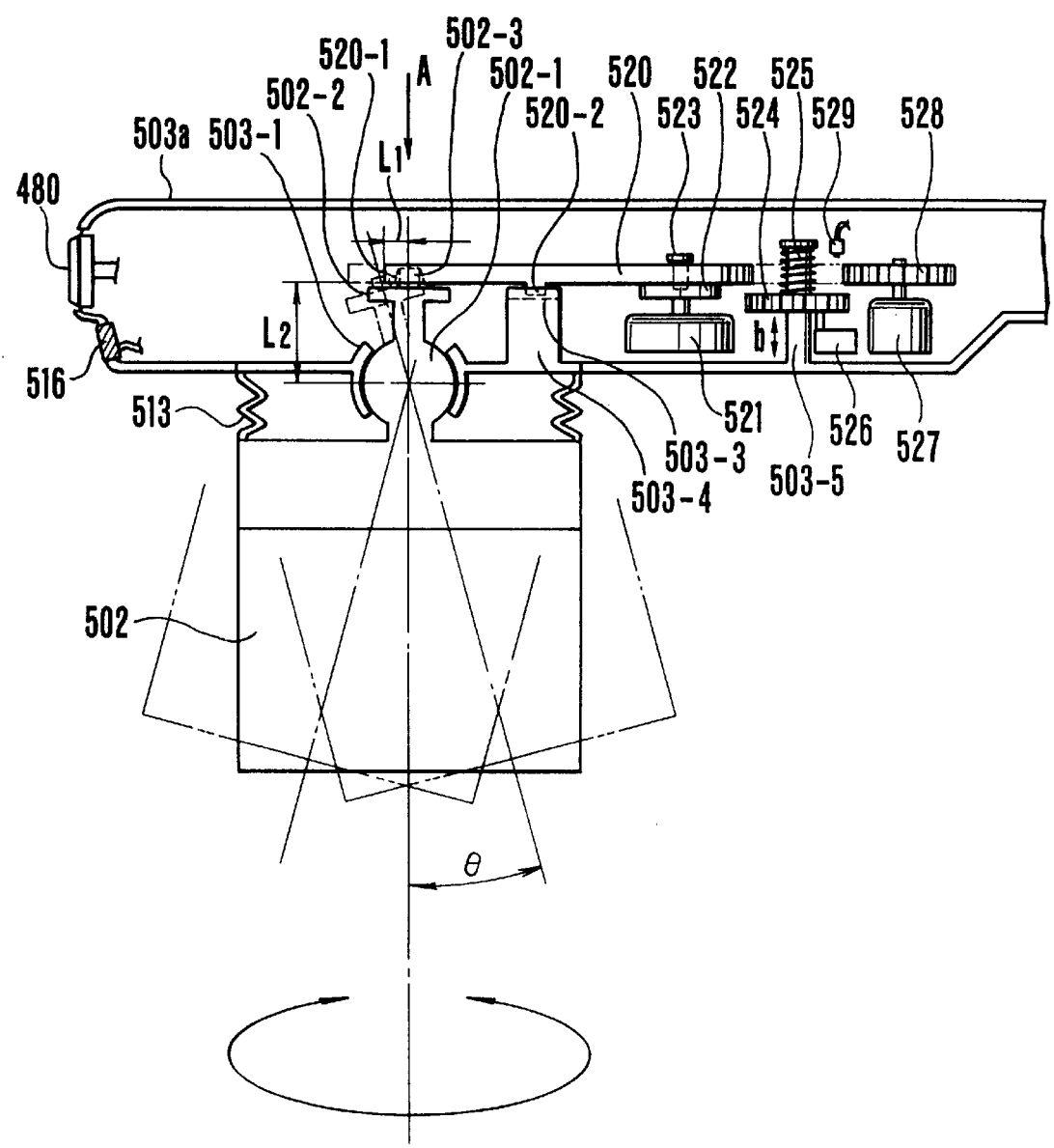
FIG. 18 is an enlarged, cross-sectional view of an image input apparatus which is an electrically driven version of the embodiment shown in FIG. 16.

FIG. 18 is a cross-sectional view showing an arrangement capable of turning the camera 502 by electrical driving. In the arrangement shown in FIG. 18, driving elements such as motors and gears are added to the elements used in the embodiment which is shown in FIG. 17 as an arrangement for manually turning the camera 502. FIG. 19(a) is a cross-sectional view of a portion of the apparatus as viewed from the front thereof in the direction of the arrow A shown in FIG. 18, and FIG. 19(b) is a fragmentary, enlarged view of the arrangement shown in FIG. 19(a).

Referring to FIGS. 18, 19(a) and 19(b), a projecting portion 502-2 having a projection 502-3 is formed integrally with the side of the pivot 502-1 which is opposite to the camera 502, the pivot 502-1 being used in the arrangement of the above-described embodiment. A lever 520 has a hole 520-1 at one end portion, and the hole 520-1 is formed to engage with the projection 502-3. The hole 520-1 is tapered in such a manner that it gradually becomes wider toward the pivot 502-1, whereby while the camera 502 is turning with its optical axis drawing a circular locus, the projection 502-3 can smoothly rotate or slide in engagement with the hole 520-1. A sector gear 520-4, which selectively meshes with a gear 524 which will be described later, is formed at the other end of the lever 520, and a hole 520-3 is formed in a portion of the lever 520 which is adjacent to the sector gear 520-4. A projection 520-2 is formed on the lower surface of the lever 520 at the middle position between the hole 520-1 and the hole 520-3. The projection 520-2 is positioned to engage with a groove 503-3 formed in a projection 503-4 which is formed within the horizontal support part 503a. A rotating plate 522 is attached to a motor 521, and an axially extended groove 522-1, which extends from the center of the rotating plate 522 toward the circumference, is formed in the top surface of the rotating plate 522. The lever 520 is attached so that a pin 523 inserted through the hole 520-3 can move within the extended groove 522-1 in the direction indicated by an arrow "a" and so that the projection 520-2 can engage with the slot 503-3. The length of the arc of the extended groove 522-1 is selected so that the point of the lever 520 which corresponds to the center of the rotating plate 522 (the axis of the pin 523) can move in an arc of radius L by a maximum distance of L1 in the direction of the arrow "a". The radius L is the distance from the axis of the projection 520-2 to the center of the rotating plate 522 (the axis of the pin 523). A projection 503-5 is formed within the horizontal support part 503a, and a gear 524 is fitted onto the projection 503-5 in such a manner that it can rotate about the projection 503-5 and also move along the length thereof in the direction indicated by an arrow "b". The gear 524 is consistently urged toward a solenoid 526 by a spring 525. When the solenoid 526 is energized, the gear 524 meshes with the sector gear 520-4 and a gear 528 which is attached to a motor 527. Detecting means 529 is provided for detecting whether the meshing of the gears 524, 520-4 and 528 has been completed.

The operation of the above-described embodiment will be described below. In the following description, it is assumed that: θ is the angle by which the camera 502 is to be turned; the distance from the hole 520-1 of the lever 520 to the projection 520-2 and the distance from the hole 520-3 of the lever 520 to the projection 520-2 are equal (L); and L1 is the amount of turning of the point of the lever 520 which corresponds to the center of the rotating plate 522. The above amounts may be arbitrarily selected.

If the camera 502 is to be turned, a button (not shown) is pressed and the solenoid 526 is energized by an electrical signal. The gear 524 meshes with the gear 528 and the sector gear 520-4. When the completion of the meshing of the gears 524, 528 and 520-4 is detected by the sensor (detecting means) 529, the motor 527 is driven and the driving force of the motor 527 is transmitted to the sector gear 520-4 of the lever 520 through the gears 528 and 524, thereby turning the lever 520 on the axis of the projection 520-2 in the direction of the arrow "a". The amount of turning of the lever 520 is displayed on display means (not shown). If a button (not shown) is pressed when the lever 520 turns by the amount L1, the motor 527 stops and the lever 520 also stops. The solenoid 526 is de-energized and the gear 524 disengages from the sector gear 520-4 and the gear 528. The lever 520 is fixed in the position (L1) to which it has been turned, by fixing means (not shown). Thereafter, if a button (not shown) is pressed, the motor 521 is driven and the driving force of the motor 521 is transmitted to the rotating plate 522. The lever 520 starts to turn above the rotating plate 522 by the amount of eccentricity (radius) L1, and the projection 520-2 slides along the groove 503-3 in parallel therewith. Since the distance from the hole 520-1 to the projection 520-2 and the distance from the hole 520-3 to the projection 520-2 are made equal (L), the projection 502-3 of the end of the camera 502 which is connected to the lever 520 is turned in such a manner that the projection 502-3 draws a circular locus having the radius L1 about the axis of the pivot 502-1. The camera 502 is turned at the angle θ with respect to the axis of the pivot 502-1 in such a manner that the optical axis of the camera 502 draws a circular locus. To input a desired portion of an image original placed on the base 501, a button (not shown) may be pressed to stop the camera 502 at the desired position. The above-described operation is controlled by a controlling circuit (not shown).

In the above-described embodiment, if L2 represents the distance between the lever 520 and a line passing through the center of the pivot 502-1 (refer to FIG. 18), the following relationship is obtained:

$$L1 = L2 \tan \theta$$

As shown in FIG. 18, the horizontal support part 503a is also provided with a light receiving sensor part 516 for a wireless remote controller (not shown) so that all of the above-described operations can be executed under remote control by using the wireless remote controller. The remote control will be described later in detail.

According to each of the embodiments described above with reference to FIGS. 16 to 19(a), 19(b), an imaging part is secured to a support member in such a manner that the imaging part can turn while the optical axis thereof is drawing a circular locus. Accordingly, it is possible to easily image, for example, a side face (excluding the top face) of a solid object placed on a base or an area outside of an original without the need to rotate or move the solid object or the original. Accordingly, it is possible to provide an image input apparatus of good operability which does not require a complicated operation. If an arrangement is added which permits the imaging part to be turned under remote control using a remote controller or the like, the range of applications of the image input apparatus is extended, whereby a more useful image input apparatus can be provided.

Figure 20:
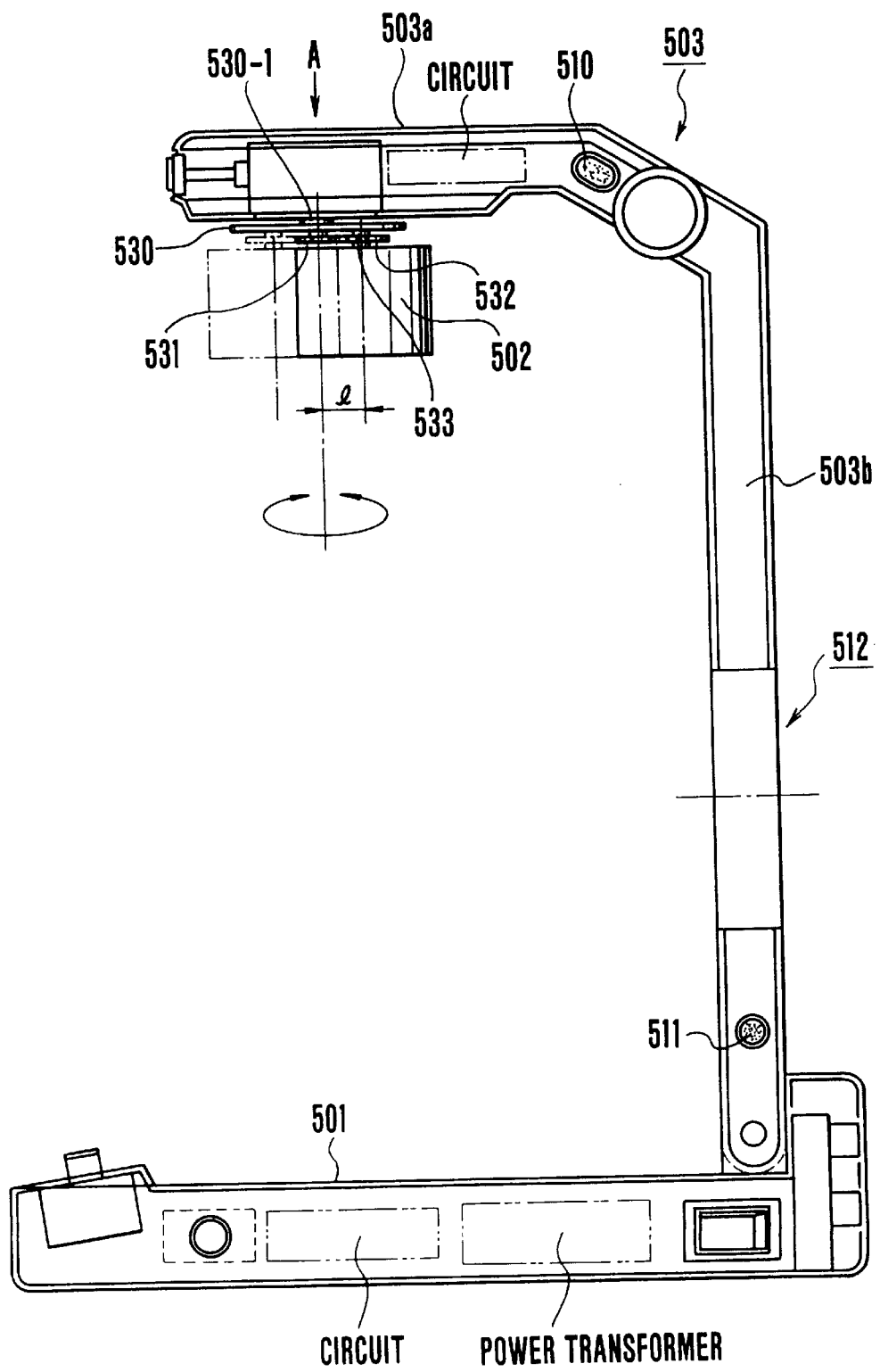
FIG. 20 is a diagrammatic, cross-sectional view of one example of the image input apparatus.
Figure 21:
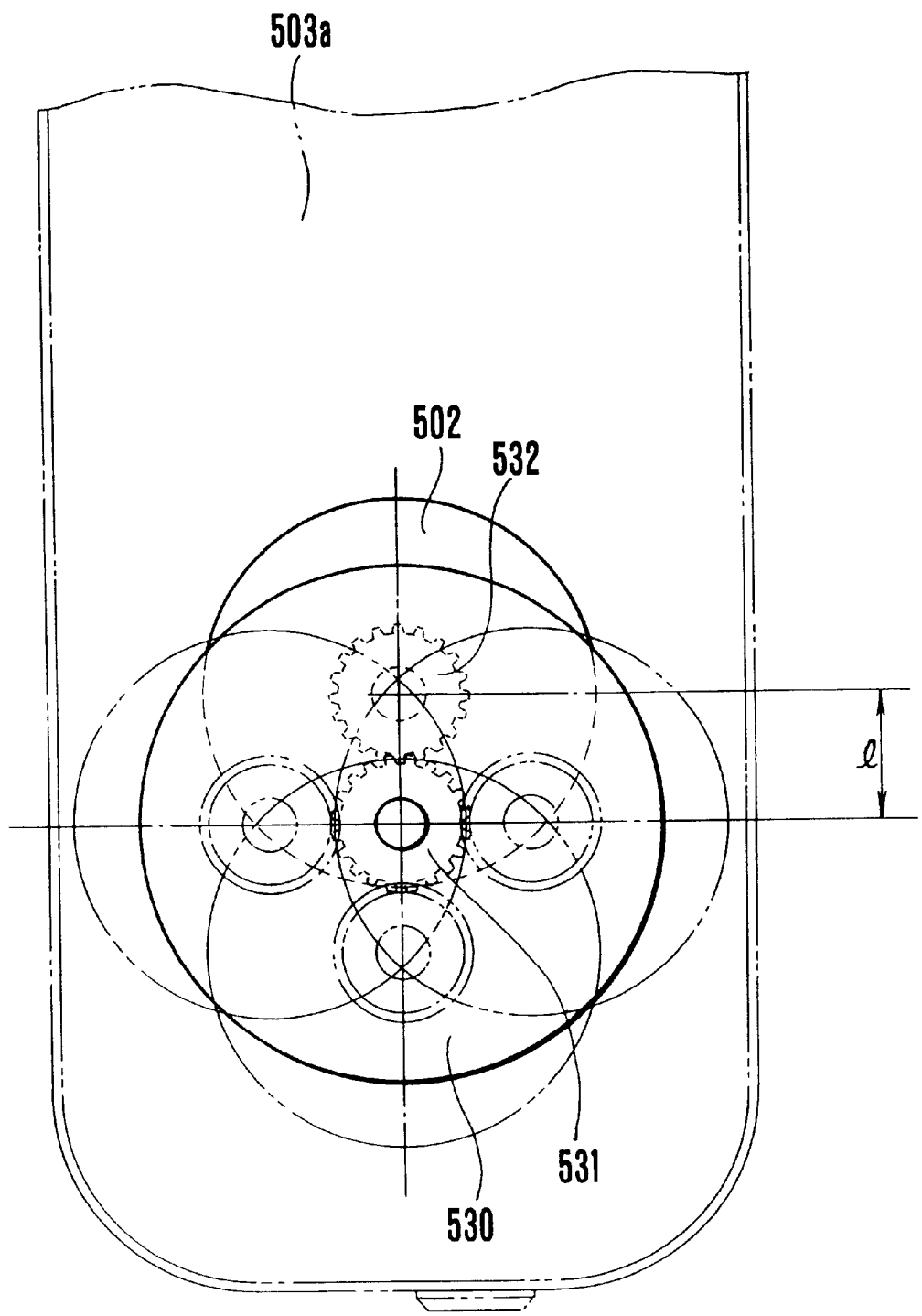
FIG. 21 is a cross-sectional view of a portion of the apparatus as viewed from the front thereof in the direction of the arrow A shown in FIG. 20.

FIG. 20 shows another embodiment in which a camera part is movable, and the embodiment of FIG. 20 differs from the embodiments shown in FIGS. 16 to 19(a), 19(b) regarding the manner of mounting the camera 502 on the horizontal support part 503a and the manner of the turning operation of the camera 502. FIG. 21 is a cross-sectional view of a portion of the apparatus as viewed from the front thereof in the direction of the arrow A shown in FIG. 20.

Referring to FIG. 20, a gear 531 and a central shaft 530-1 are formed integrally with the central portion of a rotary disk 530 of thin-sheet shape. The gear 531 is located on the side where the camera 502 is disposed, while the central shaft 530-1 is located on the side where the horizontal support part 503a is disposed. The rotary disk 530 is turnably secured to the horizontal support part 503a by the central shaft 530-1. A shaft 533 is turnably secured to the rotary disk 530 at a location spaced a distance l apart from the rotational axis of the shaft 530. A gear 532 which is formed integrally with the camera 502 is turnably secured to the shaft 533 and is engaged with the gear 531.

In operation, as shown in FIG. 21, when the camera 502 is turned, the gear 532 integral with the camera 502 turns around the gear 531 in a circle having a radius l. The gear 531 is secured to the horizontal support part 503a in such a manner that it can rotate integrally with the rotary disk 530, and a slip mechanism (not shown) is disposed between the shaft 533 and the rotary disk 530. Accordingly, no matter where the camera 502 is located within its turnable range, the vertical or horizontal positional relationship of an image inputted into the camera 502 is never offset or inverted. In the above-described embodiment, the amount of eccentricity of the turning operation of the camera 502 is l, but the amount may be arbitrarily selected.

Figure 22:
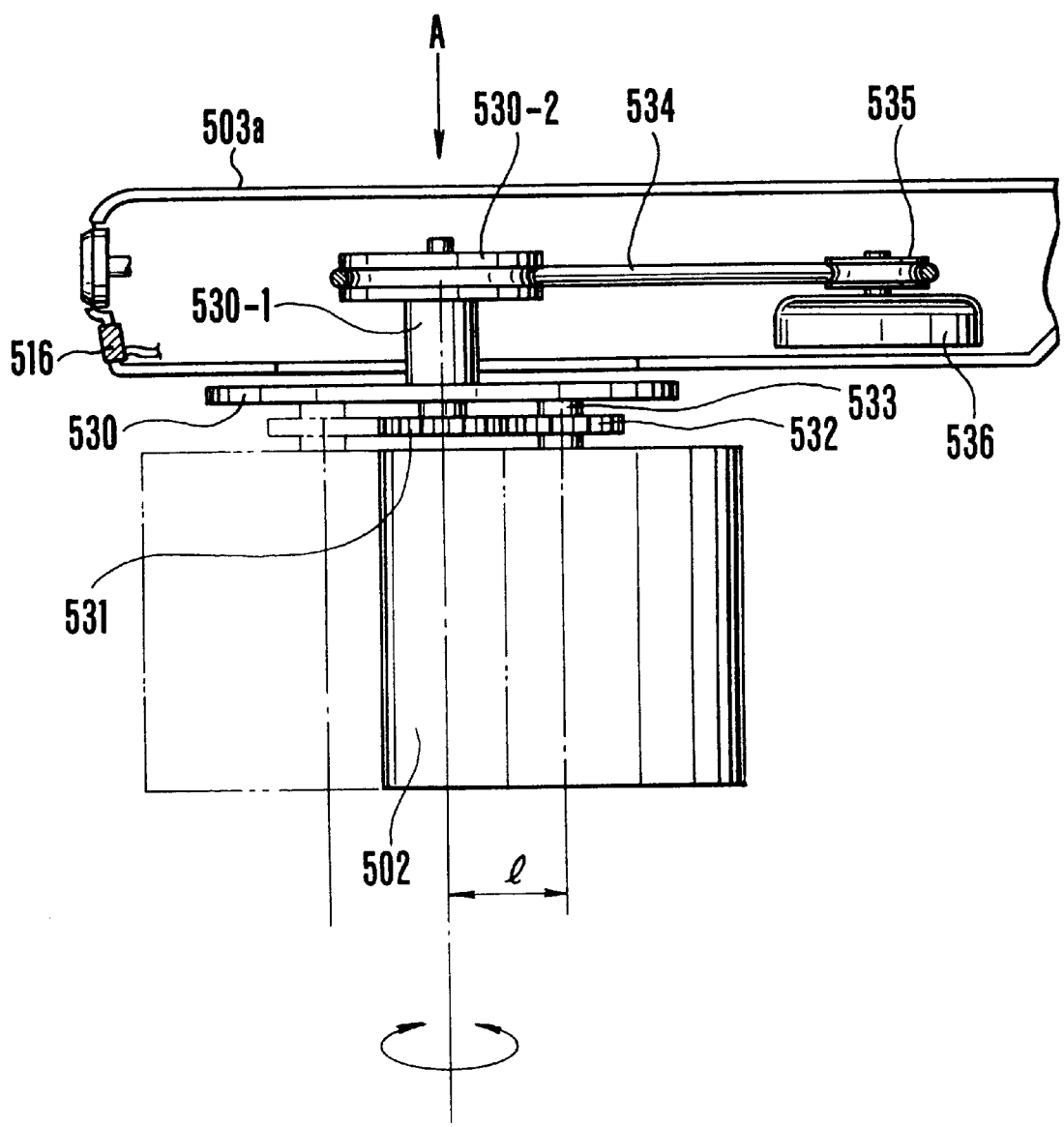
FIG. 22 is an enlarged, cross-sectional view of an image input apparatus which is an electrically driven version of the embodiment shown in FIG. 20.
Figure 23:
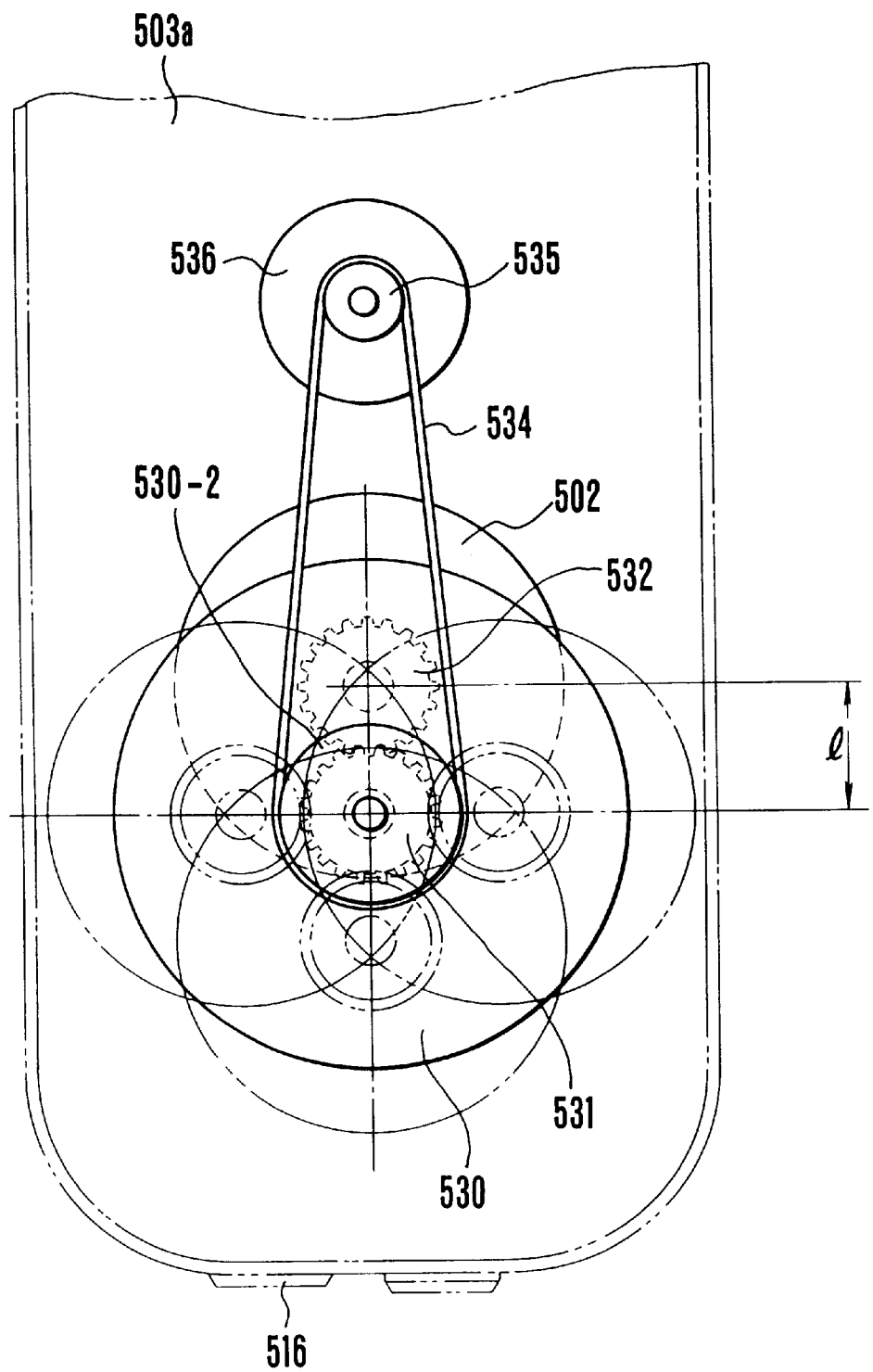
FIG. 23 is a cross-sectional view of a portion of the apparatus as viewed from the front thereof in the direction of the arrow A shown in FIG. 22.

FIG. 22 is a cross-sectional view showing an arrangement capable of turning the camera 502 by electrical driving. In the arrangement shown in FIG. 22, driving elements such as a motor, a belt and a pulley are added to the elements used in the embodiment which is shown in FIGS. 20 and 21 as an arrangement for manually turning the camera 502. FIG. 23 is a cross-sectional view of a portion of the apparatus as viewed from the front thereof in the direction of the arrow A shown in FIG. 22.

Referring to FIGS. 22 and 23, a pulley 530-2 is formed integrally with the central shaft 530-1 which constitutes part of the arrangement of the embodiment described above. The pulley 530-2 is coupled to a pulley 535 attached to a motor 536 by a belt 534. In operation, when the camera 502 is to be turned, a button (not shown) is pressed to turn on a switch, thereby driving the motor 536. The driving force of the motor 536 is transmitted to the pulley 530-2 by the belt 534, thereby rotating the rotating disk 530 and the gear 531 which are formed integrally with the pulley 530-2. Thus, the camera 502 is turned which has the gear 532 meshed with the gear 531 and turnably secured to the turnable shaft 533 which is disposed at a location spaced the distance l apart from the rotational axis of the shaft 530.

As shown in FIG. 22, the horizontal support part 503a is also provided with the light receiving sensor part 516 for a wireless remote controller (not shown) so that all of the above-described operations can be executed under remote control by using the wireless remote controller.

Figure 24:
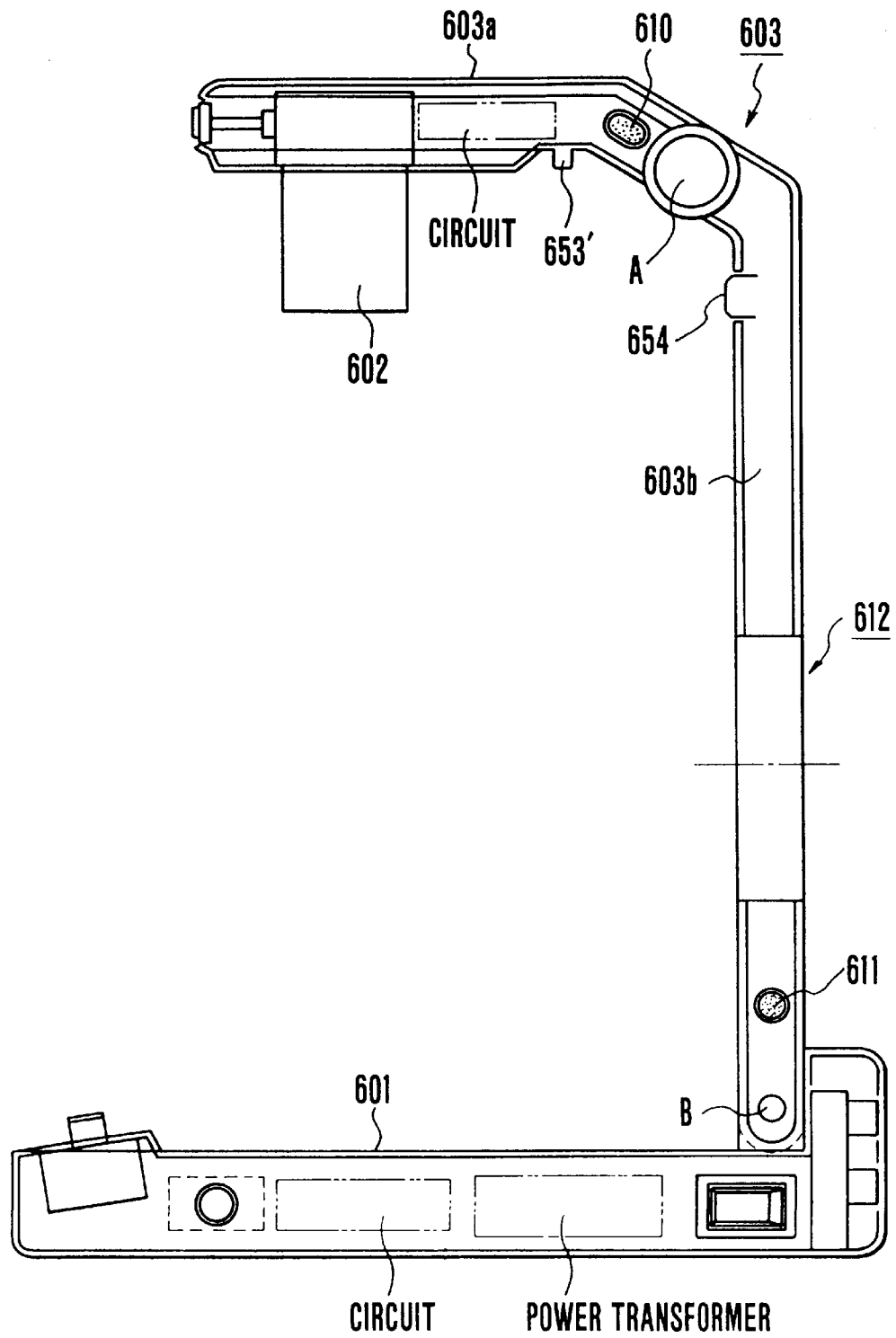
FIG. 24 is a diagrammatic, cross-sectional view of still another example of the image input apparatus.

FIG. 24 is a cross-sectional view showing an embodiment which is a further improved version of the image input apparatus used in the present system.

Referring to FIG. 24, a camera 602 having a color photoelectric conversion part is secured to a horizontal support part 603a, and a projecting portion 653' is formed so that it can engage with a button 654. The other elements are substantially identical to those of the embodiment shown in FIG. 16, and description thereof is omitted.

Figure 25:
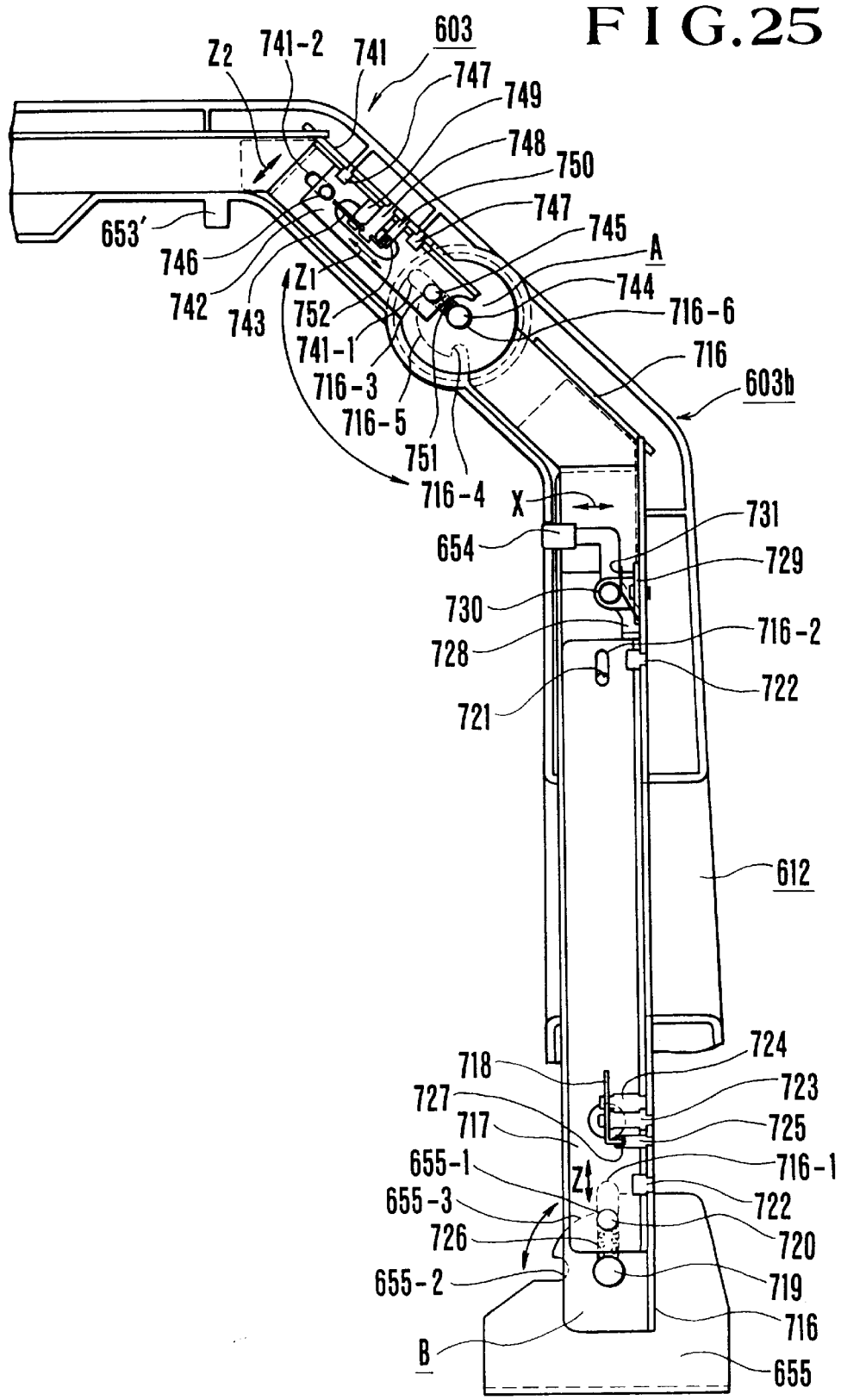
FIG. 25 is a detailed side view showing, partially in section, the mechanism of a pivot portion of each of horizontal and vertical support parts of the image input apparatus according to the embodiment shown in FIG. 24.
Figure 26:
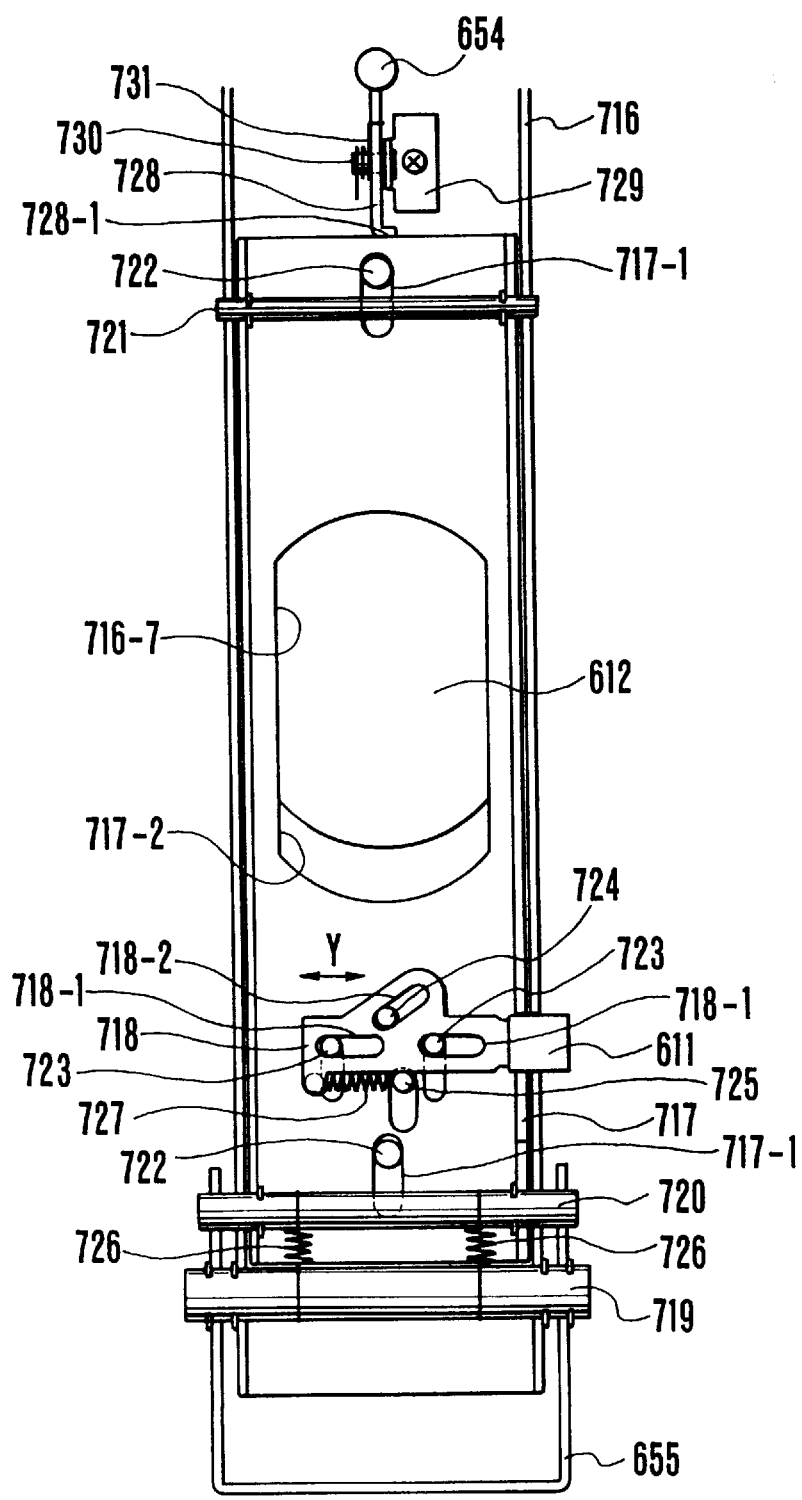
FIG. 26 is a detailed side view showing, partially in section, the mechanism of the pivot portion of each of the horizontal and vertical support parts of the image input apparatus according to the embodiment shown in FIG. 24.
Figure 27:
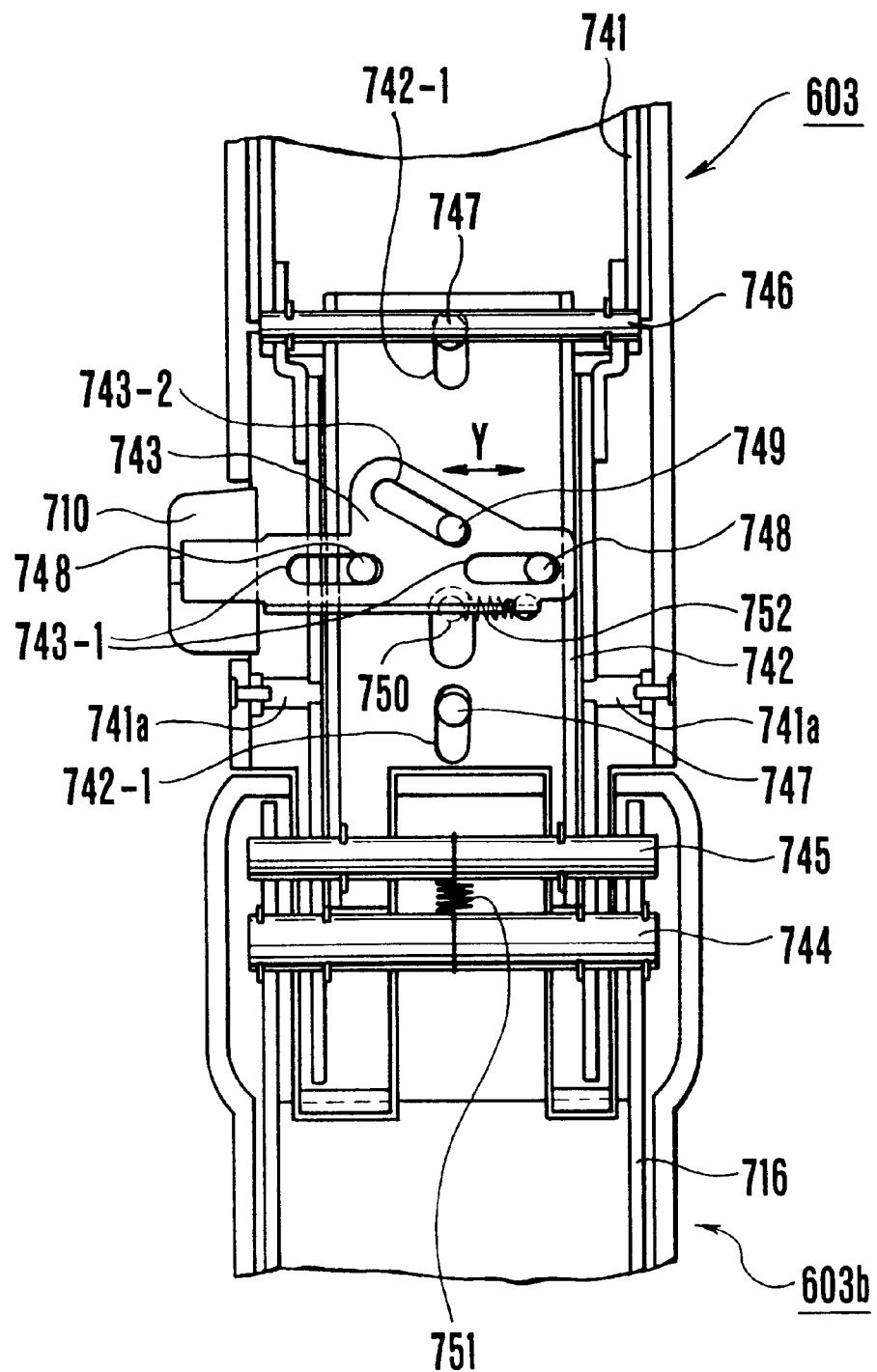
FIG. 27 is a detailed side view showing, partially in section, the mechanism of the pivot portion of each of the horizontal and vertical support parts of the image input apparatus according to the embodiment shown in FIG. 24.

FIG. 25 is a side elevational view showing, partially in section, the mechanism of a pivot portion of the horizontal support part 603a as well as the mechanism of a pivot portion of a vertical support part 603b of the image input apparatus according to the embodiment which will be described below. FIGS. 26 and 27 are cross-sectional views respectively showing the mechanism of the pivot portion of the vertical support part 603b and the mechanism of the pivot portion of the horizontal support part 603a.

A mechanism associated with folding of the vertical support part 603b will be described below with reference to FIGS. 25 and 26.

Referring to FIGS. 25 and 26, a frame 716 is provided in the interior of the vertical support part 603b, and a hole 716-7 is formed approximately in the middle of the frame 716 to prevent the previously described interference with the camera 602. The frame 716 is connected by a shaft 719 to a support plate 655 mounted in the interior of a base 601, and is rotatable about the shaft 719. A lock plate 717 is movable inside of the frame 716 in parallel therewith in the direction of an arrow Z. Similarly to the frame 716, a hole 717-2 is formed approximately in the middle of the lock plate 717. One end of the lock plate 717 is extended up to the vicinity of a pivot portion A of the horizontal support part 603a. Two slots 717-1 formed in the lock plate 717 are slidably engaged with two shafts 722 fixed to the frame 716, respectively, and the shafts 722 restrict the position of the lock plate 717 in the direction indicated by an arrow Y. Guide shafts 720 and 721 are secured to the lock plate 717. The guide shaft 720 is slidably engaged with slots 716-1 formed in the frame 716, and the guide shaft 721 is slidably engaged with slots 716-2 formed in the frame 716. Springs 726 are hooked to the guide shaft 720, and the other ends of the springs 726 are hooked to the shaft 719. The guide shaft 720 is consistently urged toward the shaft 719 by the springs 726, that is, the lock plate 717 is urged toward the shaft 719. The support plate 655 is provided with cam grooves 655-1 and 655-2, and the guide shaft 720 urged by the springs 726 engages with the cam grooves 655-1 and 655-2 to inhibit rotation of the frame 716. A slide plate 718 is provided with two slots 718-1, and two shafts 723 fixed to the frame 716 are slidably fitted into the respective slots 718-1 so that the slide plate 718 can move in the direction indicated by the arrow Y. A button 611 is attached to one end of the slide plate 718. The slide plate 718 is also provided with a 718-2 which is inclined at an angle of approximately 30° with the direction of the arrow Y. A shaft 724 fixed to the lock plate 717 is slidably fitted into the slot 718-2 with the periphery of the shaft 724 in contact with the end face of the lock plate 717 which defines the slot 718-2. One end of a spring 727 is hooked to one end portion of the slide plate 718, and the other end of the spring 727 is hooked to a shaft 725 fixed to the frame 716. The slide plate 718 is urged by the spring 727 in the direction in which the button 611 is forced outward, that is, in the direction in which the guide shaft 720 is fitted into the cam grooves 655-1 or 655-2. All of the springs 726 and 727 serve substantially the same function. A lock lever 728 has a button 654 at one end, and is rotatably secured to a holder 729 fixed to the frame 716, by a shaft 730. The lock lever 728 is urged by a spring 731 in the direction in which the button 654 is made to project, that is, so that one end of the lock lever 728 is forced against the corresponding surface of the frame 716. A lock mechanism, which is made up of the lock lever 728, the holder 729, the shaft 730, the spring 731 and the button 654, is located nearer to the pivot portion A of the horizontal support part 603a.

In the above-described arrangement, the lock mechanism acts on a pivot portion B of the vertical support part 603b in the following manner. Even if the button 611 is pressed with the horizontal support part 603a unfolded, an end face of the lock plate 717 and a bent 728-1 of the lock lever 728 interfere with each other so that the lock plate 717 is inhibited from moving in the direction of the arrow Z. The guide shaft 720 is not disengaged from the cam grooves 655-1 and the turning operation of the vertical support part 603b is inhibited. As will be described in detail later, if the horizontal support part 603a is folded, the projecting portion 653' of the horizontal support part 603a engages with the button 654 of the vertical support part 603b, so that the button 654 is forced inwardly of the vertical support part 603b and the bent 728-1 of the lock lever 728 is displaced toward a location which does not interfere with the end face of the lock plate 717. If the button 611 is pressed, the guide shaft 720 is disengaged from the cam grooves 655-1 and the turning operation of the vertical support part 603*b* becomes possible.

The function of folding the horizontal support part 603*a* will be described below with reference to FIGS. 25 and 27. Referring to FIGS. 25 and 27, a frame 741 is provided in the interior of the horizontal support part 603*a*. The frame 741 is connected by a shaft 744 to the frame 716 provided in the vertical support part 603*b*, and is rotatable about the shaft 744. A lock plate 742 is arranged to move inside of the frame 741 in parallel therewith in the direction indicated by an arrow $Z_1$. The lock plate 742 has two slots 742-1, and two shafts 747 fixed to the frame 741 are slidably fitted into the respective slots 742-1, thereby restricting the position of the lock plate 742 in the direction of the arrow Y. Guide shafts 745 and 746 are secured to the lock plate 742, and the guide shaft 745 is slidably fitted into 741-1 formed in the frame 741, while the guide shaft 746 is slidably fitted into slots 741-2 formed in the frame 741. One end of a spring 751 is hooked to the guide shaft 745, while the other end of the spring 751 is hooked to the shaft 744. The guide shaft 745 is consistently urged toward the shaft 744 by the spring 751, that is, the lock plate 742 is consistently urged toward the shaft 744. Cam grooves 716-3 and 716-4 are formed in the frame 716, and the guide shaft 745 urged by the spring 751 is engaged with the cam grooves 716-3 or 716-4 to inhibit rotation of the frame 741. A slide plate 743 has two slots 743-1, and two shafts 748 fixed to the frame 741 are slidably fitted into the respectively slots 743-1. The slide plate 743 is movable in the direction of the arrow Y, and a button 710 is attached to one end of the slide plate 743. The slide plate 743 is also provided with a slot 743-2 which is inclined at an angle of approximately 30° with the direction of the arrow Y. A shaft 749 fixed to the lock plate 742 is slidably fitted into the slot 743-2 with the periphery of the shaft 749 in contact with the end face of the lock plate 742 which defines the slot 743-2. One end of a spring 752 is hooked to one end portion of the slide plate 743, and the other end of the spring 752 is hooked to a shaft 750 fixed to the frame 741. The slide plate 743 is urged by the spring 752 in the direction in which the button 710 is forced outward, that is, in the direction in which the guide shaft 745 is fitted into the cam grooves 716-3 or 716-4 of the frame 716.

The order in which the horizontal support part 603*a* is folded will be described below.

When the button 710 is pressed, the slide plate 743 is moved in the direction of the arrow Y (toward the right as viewed in FIG. 25). The shaft 749 fixed to the lock plate 742 slides on the end face of the slide plate 743 which defines the inclined slot 743-2, so that the lock plate 742 is moved in the direction of the arrow $Z_1$ and the shaft 745 attached to the lock plate 742 is disengaged from the cam grooves 716-3 of the frame 716. Thus, folding of the horizontal support part 603*a* is made possible. As the horizontal support part 603*a* is folded, the shaft 745 turns while sliding on cam surfaces 716-5 of the frame 716. When the shaft 745 reaches a predetermined position, the shaft 745 is fitted into the cam grooves 716-4, whereby the horizontal support part 603*a* is locked. Thus, the folding of the horizontal support part 603*a* is completed. When the horizontal support part 603*a* is folded, the projecting portion 653' provided in the vicinity of the pivot portion A of the horizontal support part 603*a* engages with the button 654 which is provided in the vertical support part 603*b* in the vicinity of the pivot portion A of the horizontal support part 603*a*, so that the button 654 is forced inwardly of the vertical support part 603*a* and the bent 728-1 of the lock lever 728 is displaced toward the location which does not interfere with the end face of the lock plate 717. Subsequently, it is possible to perform the operation of folding the vertical support part 603*b*.

The order in which the vertical support part 603*b* is folded will be described below.

When the button 611 is pressed, the slide plate 718 is moved in the direction of the arrow Y (toward the left as viewed in FIG. 26). The shaft 724 fixed to the lock plate 717 slides on the end face of the slide plate 718 which defines the inclined slot 718-2 so that the lock plate 717 is moved in the direction of the arrow Z and the shaft 720 attached to the lock plate 717 is disengaged from the cam grooves 655-1 of the support plate 655. Thus, folding of the vertical support part 603*b* is made possible. As the vertical support part 603*b* is folded, the shaft 720 turns while sliding on cam surfaces 655-3 of the support plate 655. When the shaft 720 reaches a predetermined position, the shaft 720 is fitted into the cam grooves 655-2, whereby the vertical support part 603*b* is locked. Thus, the folding of the vertical support part 603*b* is completed. The folding operation of the aforesaid embodiment of the image input apparatus is realized by the above-described mechanism.

The above-described embodiment is provided with the lock mechanism capable of inhibiting the turning operation of the vertical support part 603*b*. The lock mechanism is arranged as follows. When the horizontal support part 603*a* is folded, the projecting portion 653' provided in the vicinity of the pivot portion A of the horizontal support part 603*a* engages with the button 654 which is provided in the vertical support part 603*b* in the vicinity of the pivot portion A of the horizontal support part 603*a*, whereby the lock of the vertical support part 603*b* is cancelled. Accordingly, even if looseness acting in the direction of the arrow $Z_2$ (on the proximal side of the horizontal support part 603*a*) is produced around the pivot portion A of the horizontal support part 603*a* when the guide shaft 745 is fitted into the cam grooves 716-3 or 716-4, the position of the horizontal support part 603*a* around the projecting portion 653' is not extremely displaced by the looseness produced on the proximal side and is, therefore, insusceptible to such looseness. This is because the distance from the center of the pivot portion A of the horizontal support part 603*a* to the projecting portion 653' is made small. In particular, even in a case where the guide shaft 745 is fitted into the cam grooves 716-4 in the direction in which the projecting portion 653' is shifted from the button 654 to some extent, it is possible to reliably cancel the lock mechanism owing to the weight of the horizontal support part 603*a* itself. Accordingly, it is possible to provide an image input apparatus capable of realizing a highly reliable folding operation.

Figure 28:
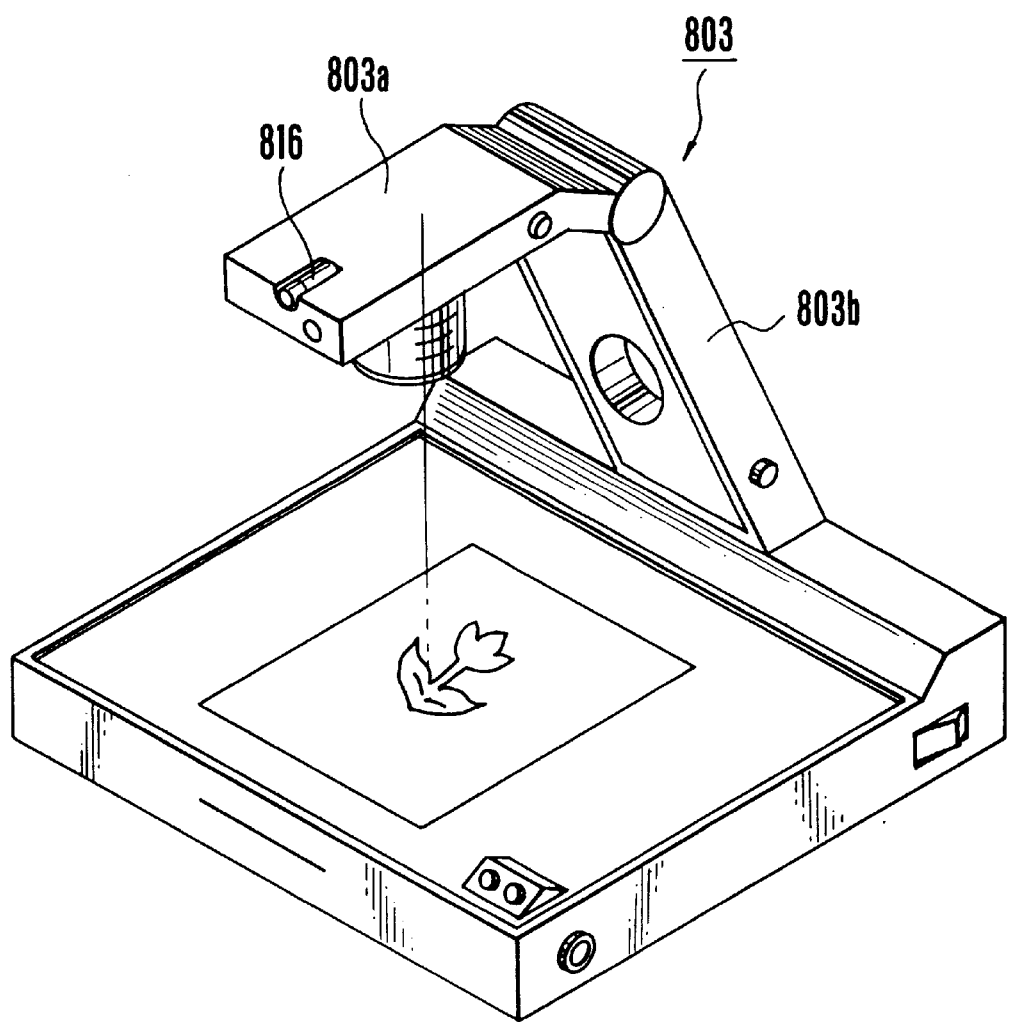
FIG. 28 is a diagrammatic, perspective view showing still another example of the image input apparatus.
Figure 29:
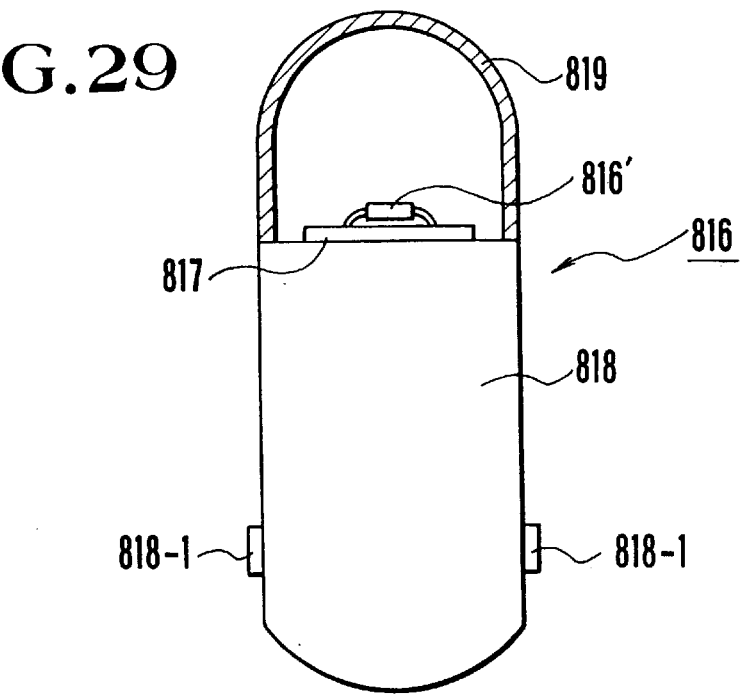
FIG. 29 is a diagrammatic, cross-sectional view showing the internal structure of the light receiving sensor part shown in FIG. 28.

FIG. 28 is a perspective view diagrammatically showing another embodiment of the image input apparatus. As shown in FIG. 28, a horizontal support part 803*a* is provided with a light receiving sensor part 816 for receiving light transmitted from a wireless remote controller (not shown). FIG. 29 is a cross-sectional view schematically showing the internal structure of the light receiving sensor part 816.

Referring to FIG. 29, a light receiving member 816' utilizing a photosensor is mounted on a base 817. The base 817 is supported on a cylindrical mount 818 which constitutes part of the exterior of the light receiving sensor part 816, and projections 818-1, which will be described later, are formed on one end portion of the exterior of the cylindrical mount 818 in such a manner that a central axis passing through the projections 818-1 crosses the longitudinal axis of the cylindrical mount 818 and that the projections 818-1 are diagonally positioned. A light collecting member 819 is attached to the mount 818 to cover the light receiving member 816', and has a round end so that it can efficiently collect light transmitted from the wireless remote controller. The light collecting member 819 is made of a methacrylate resin, and has a good optical transmission which permits incident light to be efficiently received by the light receiving member 816', a uniform wall thickness which contributes to a uniform optical transmission, and a milky-white color which irregularly reflects transmitted light.

Figure 30A:
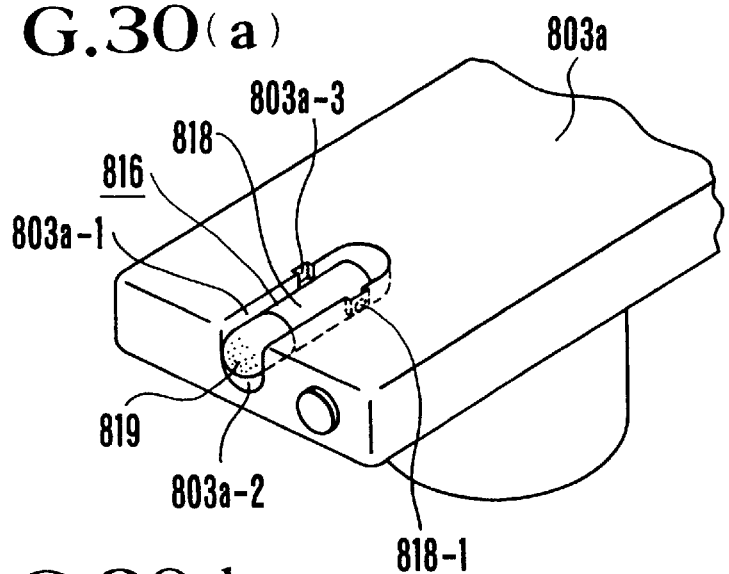
FIGS. 30(a) and 30(b) are schematic, perspective views showing different states of the light receiving sensor part attached to the horizontal support part.
Figure 30B:
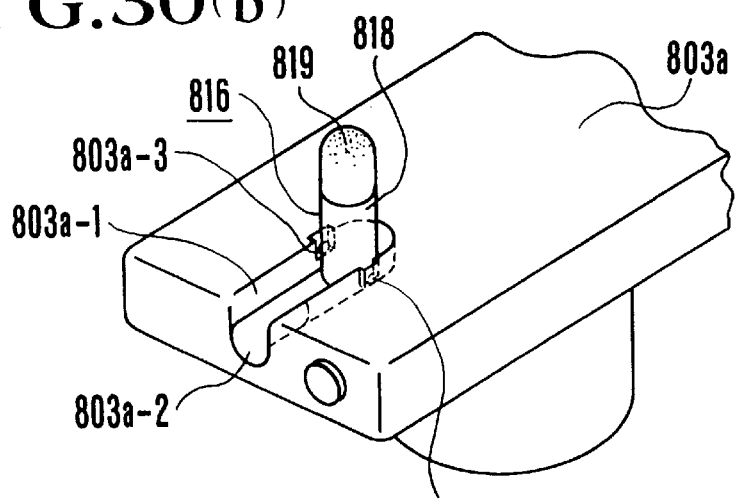
Figure 30C:
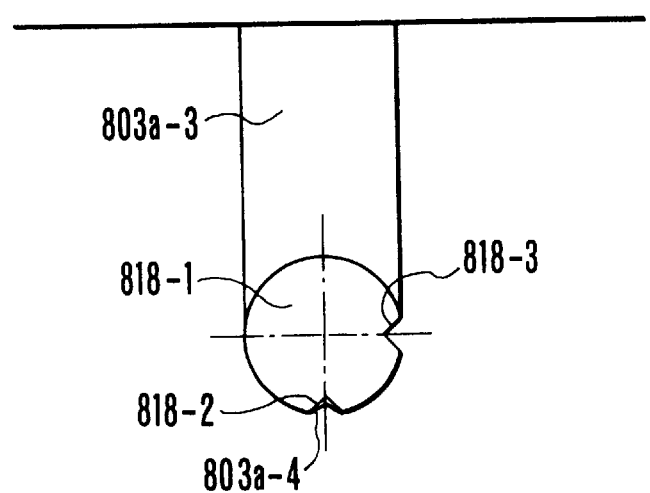
FIG. 30(c) is a schematic, enlarged view of a pivotal portion of the light receiving sensor part shown in FIGS. 30(a) and 30(b)

FIG. 30(*a*) is a diagrammatic perspective view showing the state in which the light receiving sensor part 816 is accommodated in the horizontal support part 803*a*. FIG. 30(*b*) is a diagrammatic perspective view showing the state in which the light receiving sensor part 816 is erected from the horizontal support part 803*a*. FIG. 30(*c*) is a schematic, enlarged view of a pivotal portion of the light receiving sensor part 816.

Referring to FIGS. 30(*a*) and 30(*b*), a recess 803*a*-1 for accommodating the light receiving sensor part 816 is formed in the horizontal support part 803*a*, and grooves 803*a*-3 are formed in the wall portion of the horizontal support part 803*a* which defines the recess 803*a*-1. The projections 818-1 are fitted into the respective grooves 803*a*-3. The light receiving sensor part 816 is positioned with respect to the horizontal support part 803*a* by the projections 818-1 and the corresponding grooves 803*a*-3, and is turnable about the projections 818-1. A finger hook 803*a*-2 is formed as a slanted surface to which a finger is hooked to turn the light receiving sensor part 816.

As shown in FIG. 30(*c*), two V-shaped notches 818-2 and 818-3 are formed in (each of) the projection(s) 818-1 at a 90° interval, and are arranged to selectively engage with a V-shaped, projecting nail 803*a*-4 formed in the groove 803*a*-3. If the light receiving sensor part 816 is accommodated in the horizontal support part 803*a*, the notch 818-2 is engaged with the nail 803*a*-4. When a turning of the light receiving sensor part 816 is started, the notch 818-2 disengages from the nail 803*a*-4. When the light receiving sensor part 816 is turned through 90° and erected from the horizontal support part 803*a*, the notch 818-3 and the nail 803*a*-4 engage with each other. Thus, the light receiving sensor part 816 can be held at two different positions.

In the above-described embodiment, the selective engagement between the V-shaped notches 818-2 and 818-3 and the V-shaped nail 803*a*-4 is utilized as means for holding the light receiving sensor part 816 in the state of being accommodated in the horizontal support part 803*a* and in the state of being erected from the horizontal support part 803*a*. However, a shape other than the V shape may also be used, or a spring or the like may be used as such holding means. Although in the above-described embodiment the amount of turning of the light receiving sensor part 816 is 90°, an arbitrary amount may be set. Although not described herein, light received by the light receiving sensor part 816 is photoelectrically converted and controlled by a controlling circuit (not shown).

Figure 31:
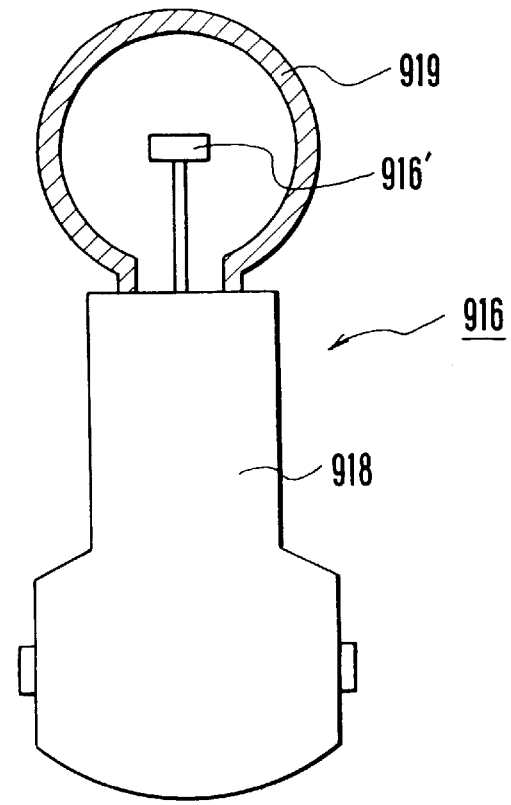
FIG. 31 is a schematic, cross-sectional view showing the internal structure of another example of the light receiving sensor part.

FIG. 31 is a schematic cross-sectional view showing the internal structure of a light receiving sensor part 916 according to another embodiment. As shown in FIG. 31, a light collecting member 919 has a spherical shape and a light receiving member 916' is disposed in the center of the light collecting member 919. This structure makes it possible to enlarge the angular extent by which the light receiving sensor part 916 can receive light, thereby improving the operability of the apparatus to a further extent. In addition, since the light collecting member 919 has the spherical shape, the portion of the mount 918 which is closer to the light collecting member 919 can be formed into a small-diameter configuration.

Figure 32:
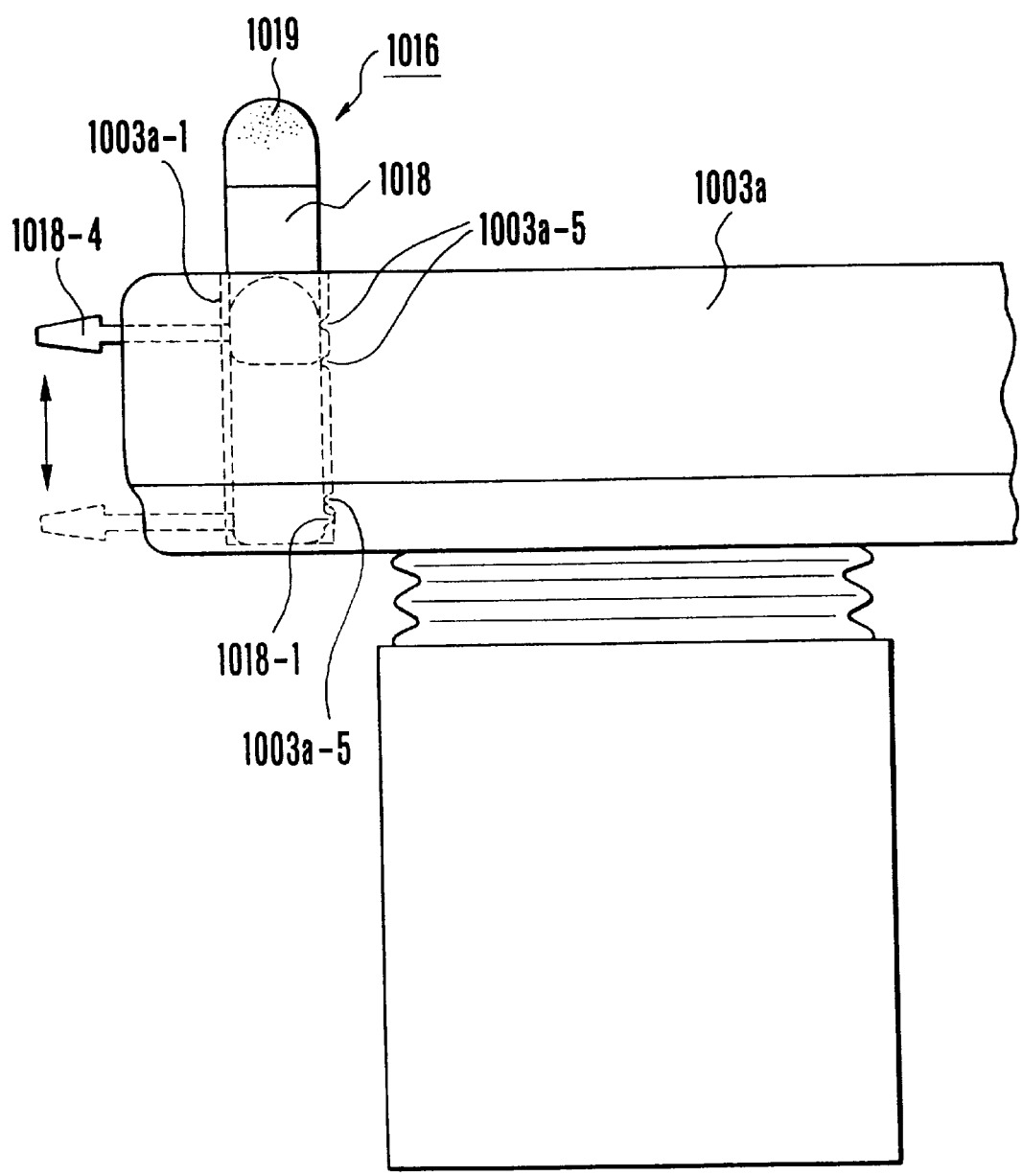
FIG. 32 is a schematic, cross-sectional view showing still another example of the light receiving sensor part.

FIG. 32 is a schematic cross-sectional view showing a light receiving sensor part 1016 according to another embodiment. As shown in FIG. 32, a light receiving sensor part 1016 is capable of selectively sliding into and out of the horizontal support part 1003*a*. The selective sliding of the light receiving sensor part 1016 into and out of the horizontal support part 1003*a* is carried out by sliding a lever 1018-4 provided on the mount 1018. A projection 1018-1 is formed on the mount 1018, and holding portions 1003*a*-5 are formed in the wall portion of the horizontal support part 1003*a* which defines a recess 1003*a*-1. The light receiving sensor part 1016 is selectively held in the state of being accommodated in the horizontal support part 1003*a* and in the state of being erected therefrom, by the selective engagement between the projection 1018-1 and the holding portions 1003*a*-5.

According to each of the embodiments described above with reference to FIGS. 29 to 32, a light receiving sensor part for receiving light transmitted from a wireless remote controller is arranged to be selectively movable into and out of a support member. When the wireless remote controller is in use, the light receiving sensor part is erected from the support part, and if the wireless remote controller is not used, the light receiving sensor part is accommodated into the support part. Accordingly, it is possible to realize a useful apparatus having an aesthetically excellent design as well as a sensor which is not easily damaged by accident since it can be accommodated when unnecessary.

In addition, since the light receiving sensor part is erected from the support member when in use, it can receive light transmitted from various directions by the wireless remote controller. For example, in the case of a lecture meeting or a presentation, a lecturer can stand and explain an article written on a sheet attached to a board or the like beside the image input apparatus, while inputting an image through the image input apparatus by operating either a desired function of an imaging part thereof, such as focusing, zooming or turning, or a switch of the imaging part under remote control using the wireless remote controller from one side of the image input apparatus. During a discussion between the lecturer and a participant, the participant can perform similar remote control by using the wireless remote controller even from behind the image input apparatus. As is apparent from the foregoing description, it is possible to enlarge the angular extent by which the light receiving sensor part can receive light transmitted from the wireless remote controller during remote control, whereby it is possible to cause the wireless remote controller to function from approximately all directions. In addition, since the light receiving sensor part can be erected from the support member by a turning or sliding operation, it is possible to realize a wireless remote control function which does not require a difficult operation, a large number of constituent parts, high cost or a large space. Accordingly, it is possible to provide a far more useful, image input apparatus which can find a far wider range of applications and which has improved operability.

While the present invention has been described with respect to what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent arrangements and functions.

What is claimed is:

1. A video conference system which enables a conference to be conducted between a plurality of terminal equipments at each of differently located points, comprising:
control means (236) which is included in a first terminal equipment at a first located point for enabling a second terminal equipment (210) at a second located point to be controlled from the first terminal equipment,
determining means for determining whether an operation order to be inputted to the second terminal equipment comes from the first terminal equipment or the second terminal equipment, and
operation inhibiting means, included in the second terminal equipment, for inhibiting execution of a predetermined operation of the second terminal equipment, when the determining means determines that the operation order comes from the first terminal equipment.

2. The system according to claim 1, wherein each of the terminal equipments which can be operated under remote control is an image input apparatus.

3. The system according to claim 2, wherein said operation inhibiting means inhibits photography of a predetermined range by said image input apparatus.

4. The system according to claim 1, further comprising:
display means for providing a visual display indicating that the predetermined operation is inhibited by inhibiting means.

5. The system according to claim 4, wherein the visual display of said display means can be selectively executed.

6. A video conference system which enables a conference to be conducted between a plurality of terminal equipments at each of differently located points, comprising:
an image input apparatus included in a first terminal equipment,
a base on which an original having an image to be inputted is to be placed,
an imaging part having a photoelectric conversion part for converting into an electrical signal the image inputted from the original placed on said base,
a support member for supporting said imaging part, wherein said imaging part is turnably secured to said support member in such a manner that an optical axis of said imaging part draws a circular locus,
controlling means, which is included in a second terminal equipment at a second located point, for enabling the first terminal equipment disposed at one of the differently located points to be controlled from the second terminal equipment in another differently located point,
operation inhibiting means which is included in the first terminal equipment for inhibiting execution of a predetermined operation of said image input means of the first terminal equipment, when said determination means determines that the operation order comes from the first terminal equipment, and
display means for providing a visual display indicating that the predetermined operation is inhibited by said operation inhibiting means.

7. The system according to claim 6, wherein said imaging part is supported by supporting means provided on said support member, at an arbitrary location within a turnable range of said imaging part.

8. The system according to claim 6, wherein said imaging part is arranged to be positioned with respect to a turning axis thereof by a positioning member provided on said support member.

9. A method of controlling of a video conference system, comprising:
a step of enabling a first terminal equipment at a first located point to be controlled from a second terminal equipment at a second located point,
a step of switching a predetermined mode,
a step of determining whether an operation order for execution of a predetermined control on said first terminal equipment side, to be inputted to said first terminal equipment, comes from said first terminal equipment or said second terminal equipment, if said first terminal equipment is switched a predetermined mode,
a step of inhibiting execution of a predetermined control on said first terminal equipment side on the basis of the operation order which comes from said second terminal equipment, if it is determined that the operation order to be inputted to said first terminal equipment comes from said second terminal equipment, and
a step of controlling of the predetermined control on said first terminal equipment side on the basis of the operation order which comes from said first terminal equipment, if it is determined that the operation order to be inputted to said first terminal equipment comes from said first terminal equipment.

10. The method according to claim 9, wherein the predetermined operation is an operation of a camera apparatus of said first terminal equipment.

11. The method according to claim 10, wherein said camera is inhibited from photographing a predetermined range.

12. The method according to claim 9, further comprising:
a step of providing a visual display indicating that the predetermined control is inhibited.

13. A TV conference system which enables a conference to be conducted between remotely located points, comprising:
(a) a plurality of terminal equipment disposed in the remotely located points for enabling information, such as image information and sound information, to be communicated from one of the remotely located points to another in real time,
wherein one of said plurality of terminal equipment comprises an image input apparatus, including
a base on which an original having an image to be inputted is to be placed,
a first support arm joined to said base,
a second support arm turnably secured to said first support arm,
a camera head secured to said second support arm,
a close-up lens unit being turnably secured to one end of said camera head in a pivotably urged manner, wherein said first support arm and said close-up lens unit cooperate to constitute an attachment cancelling mechanism for cancelling attachment of said close-up lens unit to said camera head by causing said second support arm to turn to a particular position;
(b) controlling means for enabling the terminal equipment disposed in one of the remotely located points to be controlled from another;
(c) operation restricting means for restricting execution of a predetermined operation of the terminal equipment which can be operated under remote control; and
(d) display means for providing a visual display indicating that the predetermined operation is restricted by said operation restricting means.

* * * * *

UNITED STATES PATENT AND TRADEMARK OFFICE
CERTIFICATE OF CORRECTION

PATENT NO. : 6,195,176 B1
DATED : February 27, 2001
INVENTOR(S) : Koichi Tanno et al.

It is certified that error appears in the above-identified patent and that said Letters Patent is hereby corrected as shown below:

Column 15,
Line 1, delete "distance 1" and insert -- distance $\ell$ --.
Line 7, delete "radius 1" and insert -- radius $\ell$ --.
Line 15, delete "is 1," and insert -- is $\ell$, --.
Line 38, delete "distance 1" and insert -- distance $\ell$ --.

Signed and Sealed this

Sixteenth Day of July, 2002

Attest:

Attesting Officer

JAMES E. ROGAN
Director of the United States Patent and Trademark Office